United States Patent [19]
Ogiwara et al.

[11] Patent Number: 6,057,878
[45] Date of Patent: *May 2, 2000

[54] THREE-DIMENSIONAL PICTURE IMAGE DISPLAY APPARATUS

[75] Inventors: Akifumi Ogiwara, Hirakata; Yukio Tanaka, Kadoma; Koji Akiyama, Neyagawa; Hisahito Ogawa, Ikoma; Hiroshi Tsutsui, Yawata, all of Japan

[73] Assignee: Matsushita Electric Industrial Co., Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/731,574

[22] Filed: Oct. 16, 1996

Related U.S. Application Data

[63] Continuation of application No. 08/328,426, Oct. 25, 1994, abandoned.

[30] Foreign Application Priority Data

Oct. 26, 1993 [JP] Japan .................................. 5-267038
Dec. 27, 1993 [JP] Japan .................................. 5-333865

[51] Int. Cl.$^7$ ............................................... H04N 13/04
[52] U.S. Cl. ................................................. 348/56; 348/51
[58] Field of Search ............................ 348/40, 42, 46–48, 348/51, 54–57, 143; 349/62; 352/98; 359/464; H04N 7/18, 13/04

[56] References Cited

U.S. PATENT DOCUMENTS

| | | | |
|---|---|---|---|
| 3,821,466 | 6/1974 | Roese | 348/56 |
| 4,167,756 | 9/1979 | Smith | 348/143 |
| 4,333,715 | 6/1982 | Brooks | 359/53 |
| 4,376,950 | 3/1983 | Brown et al. | 348/40 |
| 4,561,731 | 12/1985 | Kley | 349/62 |
| 4,566,031 | 1/1986 | Kirk | 348/40 |
| 4,717,949 | 1/1988 | Eichenlaub | 348/54 |
| 4,807,965 | 2/1989 | Garakani | 359/464 |
| 4,829,365 | 5/1989 | Eichenlaub | 348/42 |
| 4,853,769 | 8/1989 | Kollin . | |
| 4,884,131 | 11/1989 | Chevion et al. . | |
| 4,934,773 | 6/1990 | Becker . | |
| 5,034,809 | 7/1991 | Katoh . | |
| 5,036,385 | 7/1991 | Eichenlaub | 348/55 |
| 5,179,463 | 1/1993 | Kramer . | |
| 5,223,925 | 6/1993 | Hattori . | |
| 5,283,640 | 2/1994 | Tilton | 348/42 |
| 5,381,249 | 1/1995 | Burney | 348/40 |
| 5,448,322 | 9/1995 | Bacs, Jr. | 348/42 |

FOREIGN PATENT DOCUMENTS

| | | |
|---|---|---|
| 0 590 832 A2 | 4/1994 | European Pat. Off. . |
| 2 675 003 | 10/1992 | France . |
| 1-5290 | 1/1989 | Japan . |
| 3-1217 | 1/1991 | Japan . |
| 4-285993 | 10/1992 | Japan . |
| 4-345197 | 12/1992 | Japan . |

OTHER PUBLICATIONS

Patent Abstracts of Japan, vol. 6, No. 64, (E–103), published Dec. 1, 1982, "Image Pick–up Device for Stereoscopic Picture", (Matsushita Electric Ind. Co.).

*Primary Examiner*—Richard Lee
*Attorney, Agent, or Firm*—Morrison & Foerster LLP

[57] ABSTRACT

A three-dimensional picture image pickup apparatus picks up a plurality of two-dimensional picture images of the objective naturally from different directions sequentially at a predetermined time interval regardless of a depth of the objective or the light source etc. The picture images are reproduced sequentially at the predetermined time interval by a picture image reproducing device and deflected into a plurality of directions by a picture image deflection device to display a three-dimensional picture images.

15 Claims, 21 Drawing Sheets

Distance between the electrodes

FIG. 15
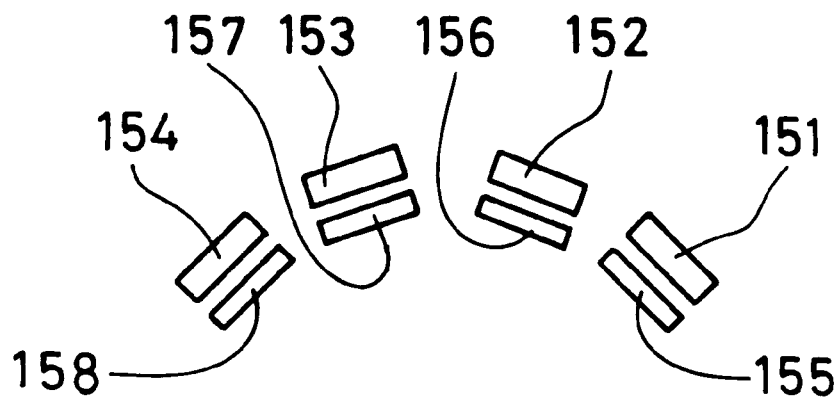
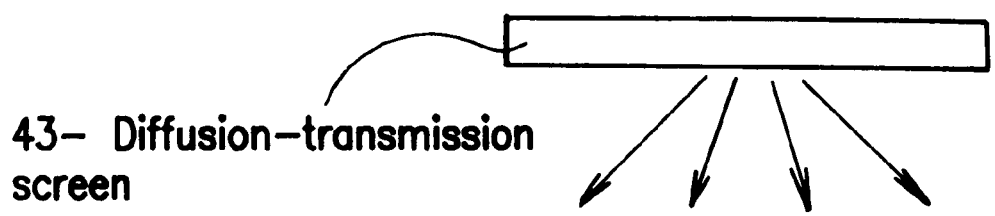
43— Diffusion-transmission screen
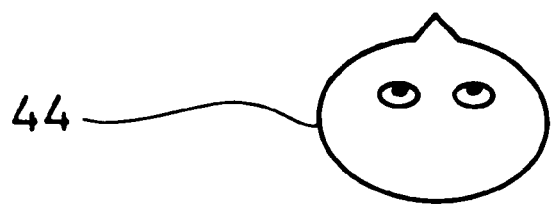
44

43— Diffusion-transmission screen

FIG.17(b) Right Eye
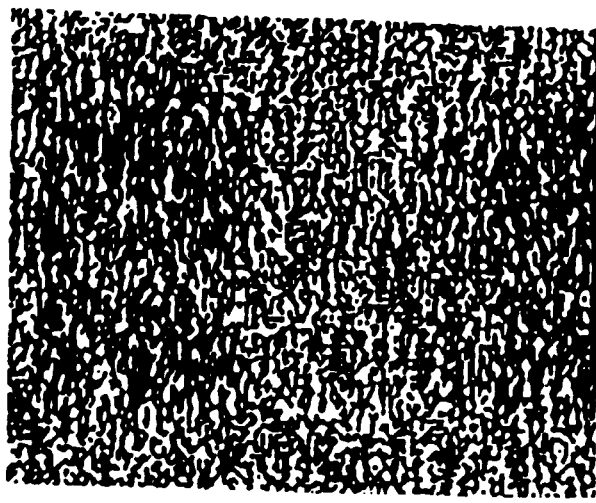
172
FIG.17(a) Left Eye
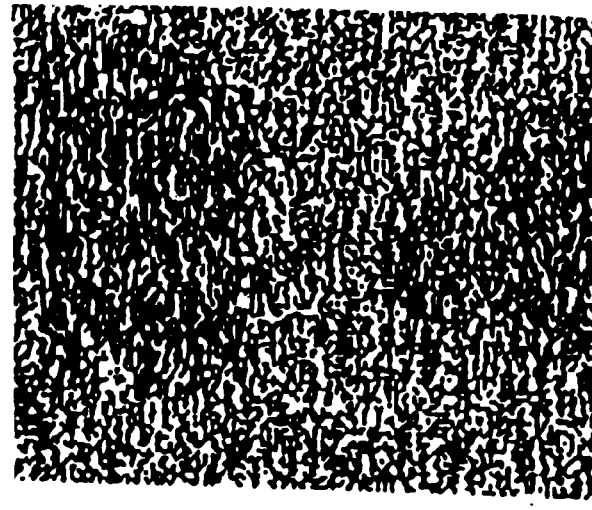
171

FIG.19 (a) (PRIOR ART)
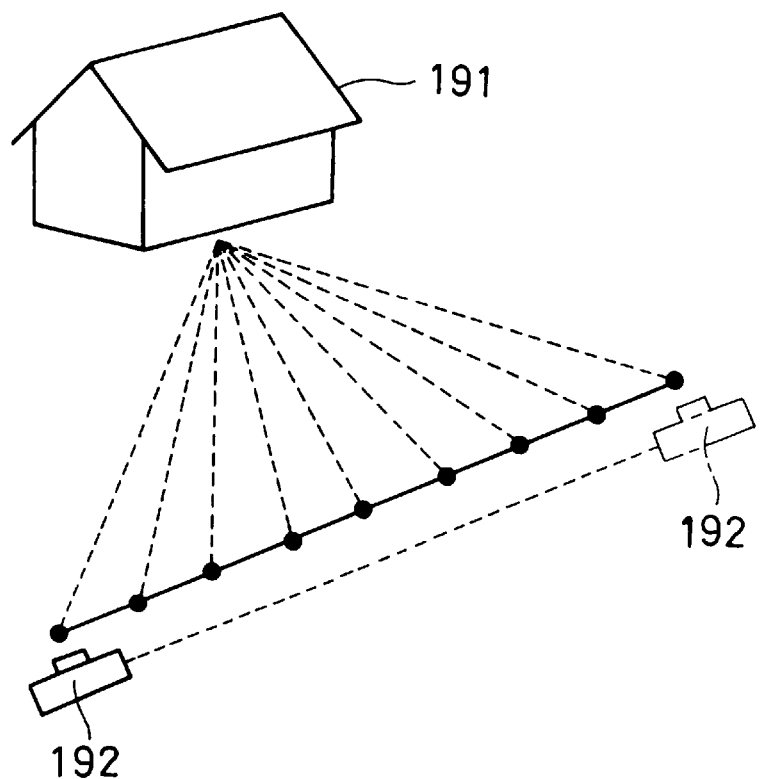
FIG.19 (b) (PRIOR ART)
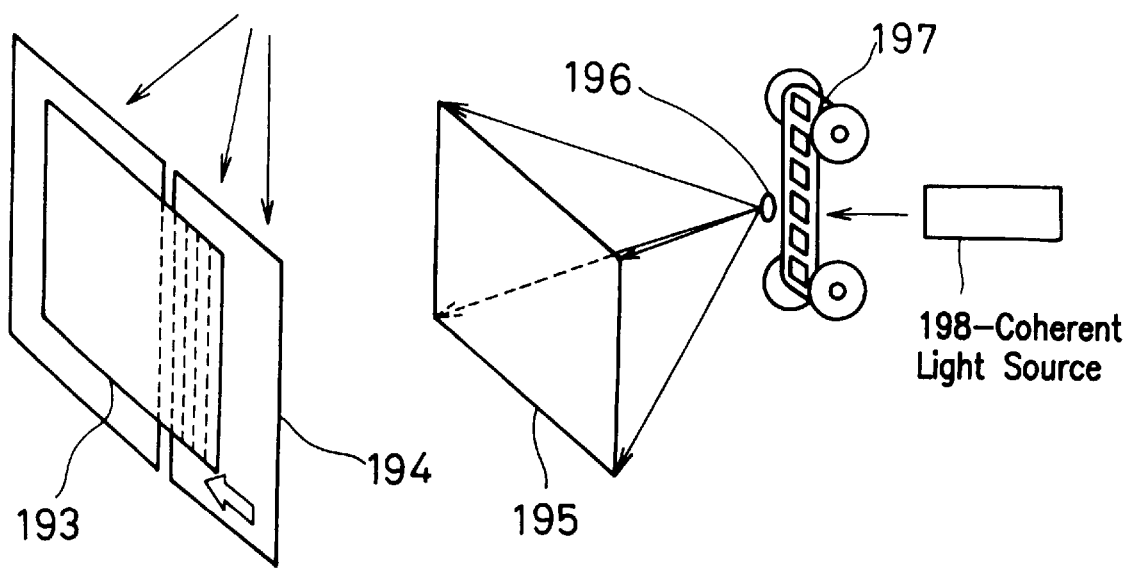

THREE-DIMENSIONAL PICTURE IMAGE DISPLAY APPARATUS

This application is a continuation of U.S. application Ser. No. 08/328,426 filed Oct. 25, 1994, now abandoned.

FIELD OF THE INVENTION

This invention relates to a three-dimensional picture image display apparatus for picking up two-dimensional picture images of a three-dimensional object and for displaying a three-dimensional picture image of the object.

DESCRIPTION OF THE PRIOR ART

A conventional three-dimensional picture image display apparatus for reproducing a stereoscopic picture image uses a spectacles which has two different colored filters or two polar screens provided in a manner to fall their polarization directions at right angle (JP-A-63-46093). In this conventional display apparatus, different two picture images are perceived by right and left eyes of an observer by using the difference between the optical characteristics of right and left eyepieces of the spectacles. The observer finds the three-dimensionality of the images by a physiological function of human brain called binocular parallax. However, it is troublesome that the observer needs the spectacles.

Recently, other three-dimensional picture image display apparatuses without using the spectacles are proposed. In a display apparatus using a lenticular lens sheet, the observer perceives two different picture images by right and left eyes, since the focuses of binocular are different responding to the span of the binocular in horizontal direction (JP-A-3-194588). Picture images of a three-dimensional object is taken by a plurality of image pickup devices from multiple directions at the same time. Data of the picture images are memorized in a memory and the picture images are newly composed into a picture image for three-dimensionally displaying. However, more than two image pickup devices are used, so that a large memory areas is necessary for memorizing the image data from each image pickup devices. Furthermore, an exclusive image signal processing circuit is necessary to compose the three-dimensional picture image from a plurality of the picture images taken by the image pickup devices. Thus, it is a problem that the system of the three-dimensional picture image display apparatus with the lenticular lens will be complex.

Furthermore, it is not necessary to use the spectacles to observe the three-dimensional picture image in the three-dimensional picture image display apparatus with the lenticular lens. However, an angle of visibility by which the stereoscopic picture image can be observed is restricted by a pitch of the lenticular lens. The angle of visibility can theoretically be expanded by reducing the pitch of the lenticular lens. Actually, positioning of the lenticular lens sheet against the image displaying surface is difficult, and the resolution of the image displaying part is restricted. Therefore, the angle of visibility which can generally be obtained is only about five degrees. When the image is observed through the lenticular lens, there is a region where the images to be observed by the right and left eyes are replaced with each other. If the observer is in the region, convex and concave of the object is unnaturally observed in opposition.

On the other hand, there is a holographic three-dimensional picture image display apparatus, in which interference fringe of reflected light from an object and reference light of laser is recorded and a three-dimensional wave surface is reproduced by the diffraction of the interference fringe (JP-A-60-11871). In this display apparatus can be reproduced a three-dimensional picture image which is substantially the same as the original object. An example of holographic stereogram is shown in FIGS. 19(a) to 19(d). A plurality of normal pictures are taken at photographing points so that each point is a little departed from adjoining points. A hologram is composed from an arrangement of the pictures. As shown in FIG. 19(a), the original plane pictures of a three-dimensional object 191 which is to be three-dimensionally displayed are taken by a camera 192 at photographing points which are lined with a predetermined narrow distance along a predetermined photographing line.

Next, the original pictures 197 are projected by a projection lens 196 one by one on a diffusion-transmission screen 195. A vertically narrow slit 194 is disposed in front of a hologram sheet 193 which can be moved sequentially. A part of the hologram sheet 193 facing the slit 194 is exposed by the light transmitting through the screen 195 and corresponding to each of the original pictures 197. Thus, all of the original pictures are recorded on the hologram sheet 193. With reference to observation of the hologram sheet 193 by binocular of an observer, when the observer approaches his face to the hologram sheet 193 shown in FIG. 19(c), the picture images respectively perceived by right and left eyes are plane pictures displayed on the screen 195, but the pictures have a binocular parallax. Thus, the picture images are looked like a stereoscopic image expanded before and behind the screen 195 to the observer. On the other hand, when the observer looks the reproduced picture image at a position apart from the hologram sheet 193 shown in FIG. 19(d), the picture image perceived by right and left eyes is not an image reproduced by an element of the hologram sheet 193, but a composition of parts of a plurality of images reproduced by a plurality of elements of the hologram sheet 193. A part of the reproduced image from each element of the hologram sheet which is to be observed is decided by the positions of the eyes of the observer. A picture image which is substantially the same as the object can be observed from the hologram sheet, if the object is disposed at the position.

In the above-mentioned three-dimensional picture image display apparatus using the hologram, a coherent light source 198 such as a laser and a photographic plate to be developed are necessary, so that it is difficult or impossible to record and reproduce the picture image at the real time. Furthermore, it is difficult to record the object having a low reflectance, so that the objective to be recorded is restrictive.

SUMMARY OF THE INVENTION

This invention provides a three-dimensional picture image display apparatus which is not restricted by the objective to be recorded and the light source to illuminate the objective, and does not need any complex signal processing device. Furthermore, the three-dimensional picture image reproduced by the three-dimensional picture image display apparatus of this invention can naturally be observed in a wide angle of visibility without using any spectacles.

A three-dimensional picture image display apparatus of this invention comprises picture image pickup means for picking up a plurality of one-dimensional or two-dimensional picture images of an objective to be displayed, picture images respectively being picked up sequentially one by one from different directions at a predetermined time difference; picture image reproducing means for reproducing the one-dimensional or two-dimensional picture images sequentially one by one in synchronism with the predetermined time interval; picture image deflection means for deflecting each of the picture images reproduced by the picture image reproducing means in a predetermined deflection direction corresponding to the direction in which the picture image is picked up by the picture image pickup means; and a diffusion-transmission screen for diffusing and transmitting the deflected picture images. By such a configuration, a plurality of two-dimensional different picture images are sequentially reproduced at different positions with a predetermined time interval. By the after image effect of human brain, an observer watches at least two different picture images by his right and left eyes. Thus, the observer finds a three-dimensional picture image by the binocular parallax.

In the three-dimensional picture image display apparatus configured above, the picture image pickup means is comprised of a plurality of picture image pickup devices which are horizontally and/or vertically arranged. Alternatively, in the three-dimensional picture image display apparatus configured above, the picture image pickup means is comprised of a plurality of mirrors and a picture image pickup device, the mirrors are horizontally and/or vertically arranged so that light beams from the object and reflected by the mirrors reach to the picture image pickup device. It is preferable that a shutter is disposed in front of each of the mirrors and the shutter is driven for opening and closing the surface of the mirror at the predetermined time interval. The predetermined deflection direction of the picture image deflection means is a direction of the mirror facing the object. The shutter is a mechanical shutter or a transmittance changeable shutter. The transmittance changeable shutter is a liquid crystal shutter using twist nematic liquid crystal, ferroelectric liquid crystal, antiferroelectric liquid crystal, dynamic scattering mode liquid crystal and so on. By such configurations, a plurality of two-dimensional picture images can be taken easily one by one at the predetermined time interval.

Furthermore, it is preferable that the picture image reproducing means is one selected among a cathode ray tube display device, an electroluminescence display device and a liquid crystal display device using twist nematic liquid crystal, ferroelectric liquid crystal, antiferroelectric liquid crystal, dynamic scattering mode liquid crystal and so on.

Furthermore, it is preferable that the picture image deflection means is a rotating mirror. Alternatively, it is preferable that the picture image deflection means is an rotating mirror arrays. Alternatively, it is preferable that the picture image deflection means is a device which deflects picture images to a plurality of directions by changing a refractive Index of a light transparent medium. Furthermore, it is preferable that the device is an acoustic optical element or a liquid crystal optical element.

Furthermore, it is preferable that transmission characteristic of the diffusion transmission screen is larger than diffusion characteristic. By such a configuration, the three-dimensional picture image can be observed naturally in the rear of the diffusion transmission screen, since the visible areas of the two-dimensional picture images are respectively deflected in predetermined directions corresponding to the directions in which the picture images are picked up by the picture image pickup means.

It is further preferable that the deflection angles of N output images are selected so that the visible areas or regions are divided into (2N−1) areas responding to the multiplicity of the overlap of the N visible areas when the number of deflected output images is N. Furthermore, it is preferable that the area where the N visible areas are overlapped is contained in the divided areas. Furthermore, it is preferable that the divided areas respectively have substantially the same area.

Furthermore, in the three-dimensional picture image display apparatus configured above, it is preferable that intensity modulation means for modulating the intensity of the picture image reproduced by the picture image reproducing means is provided between the picture image reproducing means and the picture image deflection means. Furthermore, it is preferable that the intensity modulation means is a spatial light modulator having a light information writing side and a light information readout side in a separate form, and the spatial light modulator modulates the intensity of the written picture image and transfers to the light information readout side. By such a configuration, both high precision and high luminance can be attained together which were considered as difficult.

BRIEF DESCRIPTION OF THE DRAWINGS

FIGS. 12(*b*) and 12(*c*) respectively show the relations between voltages to be applied to the picture image deflection device and time intervals;

FIG. 15 is a plan view showing a configuration of a seventh embodiment of a three-dimensional picture image display apparatus of this invention;

FIGS. 17(a) and 17(b) are examples of random dot patterns used in an embodiment of a three-dimensional picture image display apparatus of this invention;

FIGS. 19(a) to 19(d) are perspective views explaining the holographic stereogram used in the conventional three-dimensional picture image display apparatus.

DETAILED DESCRIPTION OF THE INVENTION

First Embodiment

Figure 1:
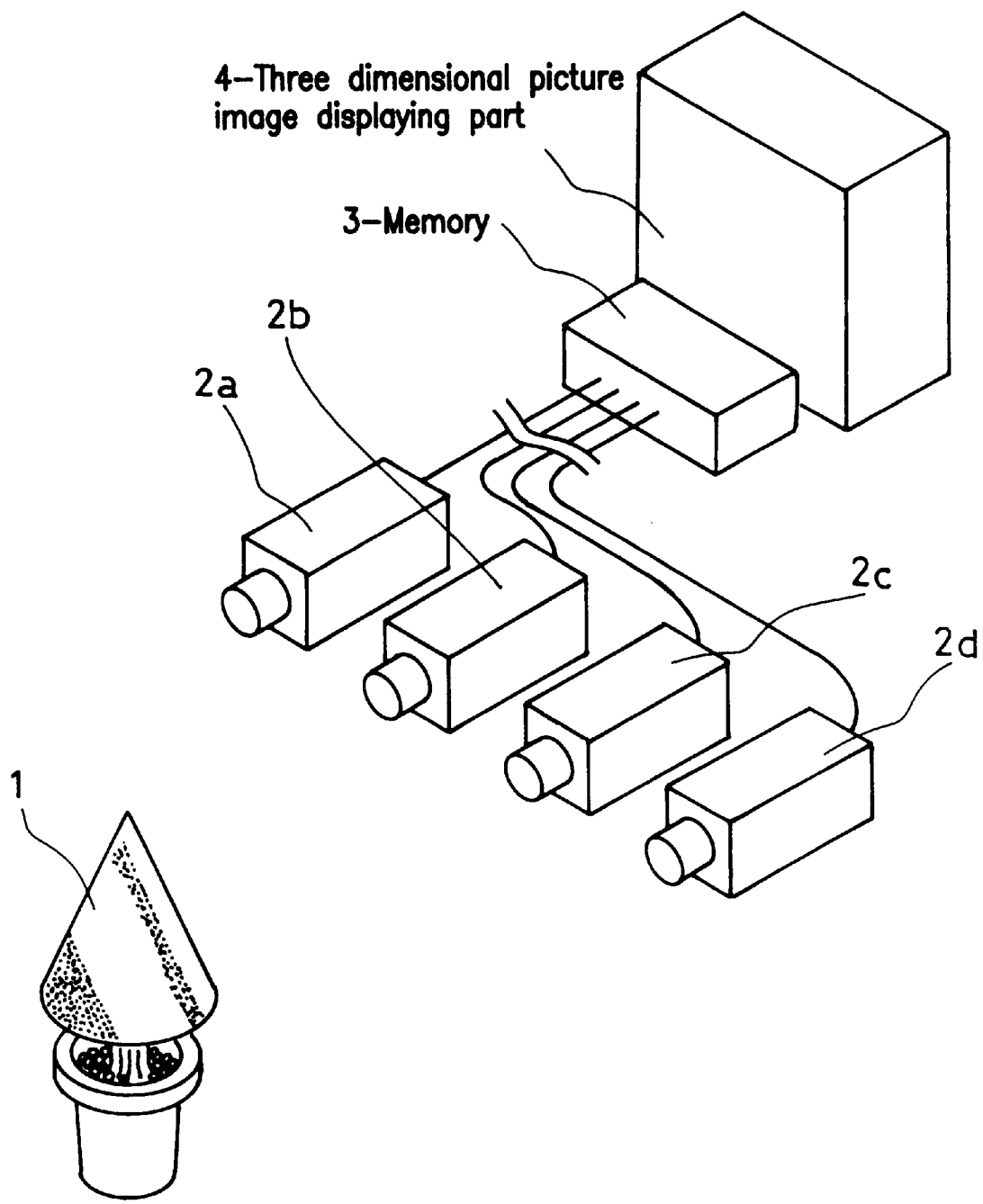
FIG. 1 is a perspective view showing a configuration of a first embodiment of a three-dimensional picture image display apparatus of this invention.
Figure 2:
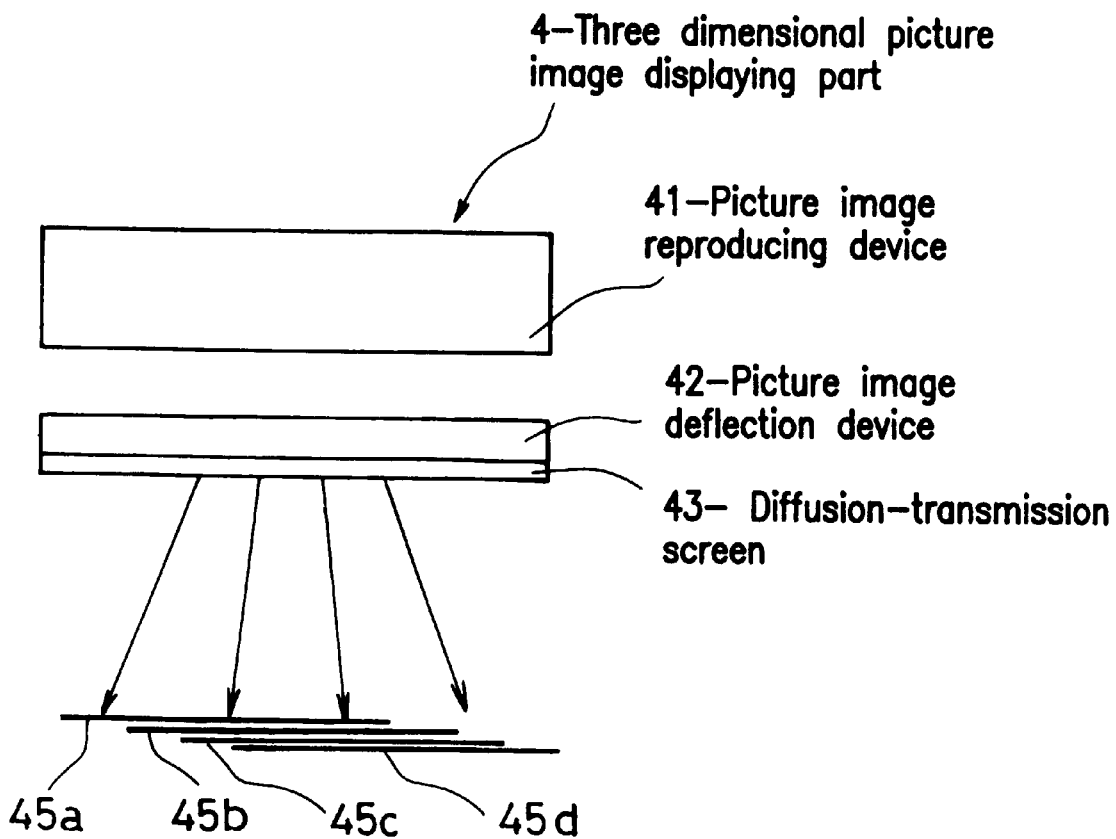
FIG. 2 is a plan view of a picture image displaying part of the three-dimensional picture image display apparatus of this invention.

A first embodiment of a three-dimensional picture image display apparatus of this invention will be described with reference to FIGS. 1 and 2. FIG. 1 shows positions of an object 1 to be recorded and displayed and a plurality of image pickup devices 2a to 2d in the three-dimensional picture image display apparatus of this invention. FIG. 2 shows a configuration of a three-dimensional picture image displaying part in the three-dimensional picture image display apparatus of this invention.

As shown in FIG. 1, four picture image pickup devices 2a to 2d which are, for example, video cameras are arranged on a horizontal line. Each of picture image pickup devices 2a to 2d sequentially picks up two-dimensional picture images of the object 1 at a predetermined time interval in time share, and outputs the image data to a memory 3. Memory 3 temporary stores the image data from each of picture image pickup devices 2a to 2d, and sequentially output the data to the three-dimensional picture image displaying part 4. Three-dimensional picture image displaying part 4 sequentially reproduces the picture images in a predetermined timing during which the after image effect of human brain is maintained (which is less than 1/30 second).

Configuration of the three-dimensional picture image displaying part 4 is described with reference to FIG. 2. As shown in FIG. 2, three-dimensional picture image displaying part 4 is comprised of a picture image reproducing device 41, a picture image deflection device 42, and a diffusion-transmission screen 43. An observer 44 will watch the picture image on picture image reproducing device 41 through picture image deflection device 42 and diffusion-transmission screen 43. Picture image reproducing device 41 is, for example, a conventional cathode ray tube display device a plasma display device, or a liquid crystal display device which reproduces the picture image two-dimensionally. Picture image deflection device 42 has a function for deflecting the picture image reproduced on picture image reproducing device 41 in an optional direction.

Hereupon, even when the two-dimensional picture images of object 1 are sequentially picked up one by one at a predetermined time interval in time share by picture image pickup devices 2a to 2d in the different directions as shown in FIG. 1, and the picture images are sequentially reproduced or displayed on picture image reproducing device 41 in synchronism with the timing of picture image pickup devices 2a to 2d without deflecting the picture images by picture image deflection device 42, observer 44 sequentially watches the picture images by his both eyes. Thus, he perceives only two-dimensional picture images of rotating object 1 by the after image effect of human brain, but he cannot perceive three-dimensional picture image.

On the other hand, each picture image on picture image reproducing device 41 is deflected in the direction, in which the picture image was picked up, by picture image deflection device 42 when the picture image is reproduced on picture image reproducing device 41. For example, the picture image picked up by picture image pickup device 2a in FIG. 1 is deflected in the direction of first output image 45a in FIG. 2. Similarly, the picture images taken by picture image pickup devices 2b to 2d are respectively deflected in the directions of second, third and fourth output images 45b, 45c, 45d. Observer 44 who stands at substantially the center front of screen 43 watches the third output image 45c by his right eye, and the second output image 45b by his left eye. These output images are perceived at the same time by the after image effect. Thus, observer 44 perceives the three-dimensional picture image by the binocular parallax. When observer 44 moves left hand from the center front of screen 43, he watches the second output image 45b by his right eye, and the first output image 45a by his left eye. When observer 44 moves right hand from the center front of screen 43, he watches the third and fourth output images 45c, 45d respectively by left and right eyes. Namely, information of the picture images corresponding to observing position produces the kinetic parallax effect, and thereby observer 44 finds more natural spatial perspective.

Figure 3:
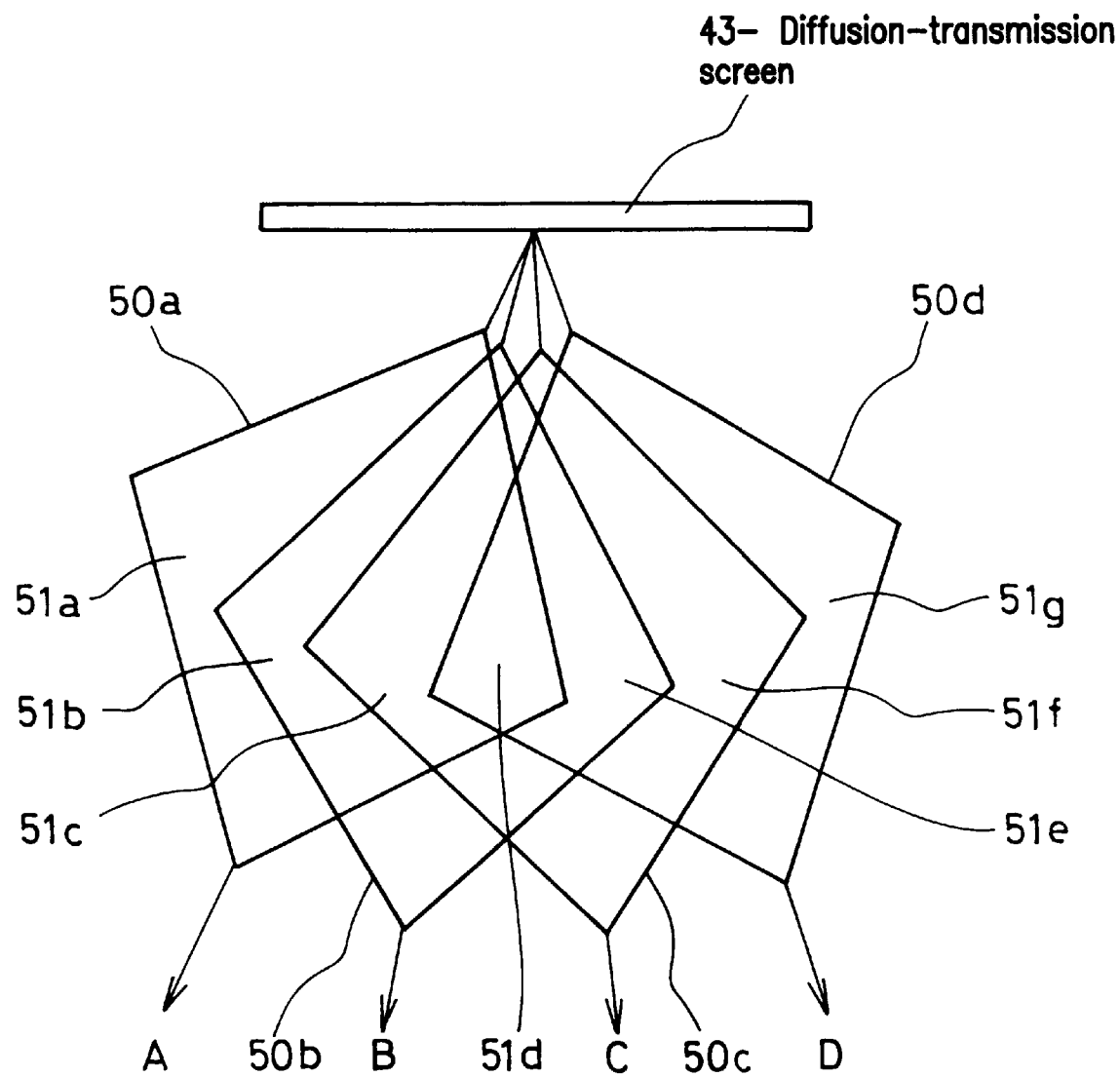
FIG. 3 is a schematic view showing the models of visible areas where the deflected picture images can be observed in the rear of screen in the three-dimensional picture image display apparatus of this invention.

Next, the principle how the three-dimensional picture image is perceived by the observer is precisely described with reference to FIG. 3. FIG. 3 shows the models of visible areas or regions where the deflected picture images can be observed in the rear of screen 43. Numerals A to D in FIG. 3 respectively designate the directions of the output images in which the picture images are taken by the picture image pickup devices. Each of numerals 50a to 50d designates the visible area where the output image 45a to 45d can be seen.

As shown in FIG. 3, the shape of the visible areas where the entire picture images deflected can be seen in the rear of the screen is assumed as a quadrilateral or a lozenge shape. Four visible areas are provided in the figure. Each of the deflected picture images can be observed from a position somehow apart from the screen in the deflection direction. The width of the area where the deflected picture image can be seen becomes wider as the distance from the screen increases. On the other hand, the intensity of the picture image becomes smaller as the distance from the screen increases, so that the width of the area is considered to be narrower. Thus, the shape of the visible areas is assumed as the quadrilateral shape.

In FIG. 3, numerals 51a to 51g respectively designate the areas divided by the overlap of visible areas 50a to 50d. In area 51a, only the first output image 45a can be seen. In area 51b, first and second output images 45a and 45b can be seen, since visible areas 50a and 50b are overlapped. In area 51d, all of first to fourth images 45a to 45d are seen.

When the observer faces the screen, his left and right eyes see the different picture images with a parallax, since the picture images are not overlapped and are independent each other in the vicinity of the screen. Thus, the observer perceives the three-dimensional picture image by the binocular parallax. Furthermore, the spatial visible area is expanded by deflecting the picture images in plural directions as shown in FIG. 3. Thus, the frame of the screen is not attracted to the observer. The observer does not feel the distance to the screen or his position so much. As a result, the spatial screen effect is generated, and the sense of two-dimensionality of the picture images reproduced on the screen is decreased. The observer can feel the depth of the ambience.

On the other hand, when the observer stands at a position somehow apart from the screen, the overlapped deflected picture images are seen to his eyes responding to the position. Furthermore, when the observer moves, the picture images with different multiplicity of overlap are seen to the right and left eyes responding to the motion. Thus, the kinetic parallax effect will work. Furthermore, when the parallax between the picture images deflectively displayed is not so large, the observer does not feel the discontinuousness of the picture images. The observer perceives a natural three-dimensional picture image having a smoothly curved surface formed by continuously connected plural overlapped two-dimensional picture images.

When the number of picture images to be reproduced and the picture image pickup devices for sequentially and time share taking the picture images are increased, and the directions for deflecting the picture images are fractionized, the three-dimensional picture image becomes more natural. By increasing the number of the picture images to be reproduced, the picture image which is to be observed by the observer is not the discontinuous plane picture images, but a more natural three-dimensional picture image. This is similar to the reason why the polygon becomes to be seen a smooth circle when the sides of polygon increases. This phenomenon can be understand similar to the conventional holographic stereogram three-dimensional picture image reproduction. The three-dimensional picture image can be observed in a wide area in the rear of the screen.

As mentioned above, the three-dimensional picture image display apparatus of this invention satisfys the elements of the binocular parallax, the kinetic parallax, the spatial screen effect and the wavefront reproduction effect similar to the holography which are necessary for realizing the three-dimensionality.

(A) The binocular parallax means that the three-dimensional picture image is perceived by the parallax between the imaged seen by left and right eyes.

(B) The kinetic parallax means that the information of the picture image is displayed by responding to the movement of the observation point.

(C) The spatial screen effect means that frame of the display is not so attractive by expanding the visible area in spatial.

(D) The wavefront reproduction effect means that the three-dimensional picture image is formed by continuous connection of plane picture images.

In comparison with the conventional spectacle type or lenticular lens type three-dimensional picture image display apparatus which uses only one element of the above-mentioned elements, more natural three-dimensional picture image can be observed by this invention as if the observer watches the actual object.

Next, the picture image deflection device 42 will be described. For obtaining the quadrilateral shaped visible areas 50a to 50c of four deflected output images as shown in FIG. 3, the transmission characteristic of screen 43 should be larger than the diffusion characteristic of screen 43. If the diffusion characteristic of screen 43 is larger than the transmission characteristic, the output image deflected by the picture image deflection device 42 is evenly and widely diffused in the rear of the screen. In this case, the visible areas shown by the quadrilaterals in FIG. 3 can not be obtained in any directions A to D so that four picture images are deflected. The visible areas of the picture images will be an area that the areas 51a to 51d are entirely combined. Therefore, even when the picture images are observed in the rear of the screen, only a two-dimensional picture image overlapping the picture images is seen, since any of the afore-mentioned element for stereoscopic picture image display is not satisfied. Furthermore, even when the observation position is changed, the picture image to be seen is not changed. On the other hand, when the transmission characteristic of the screen is larger than the diffusion characteristic, the output image is deflected in a narrow region in a predetermined deflection direction. Therefore, the three-dimensional picture image can be observed.

Figure 5:
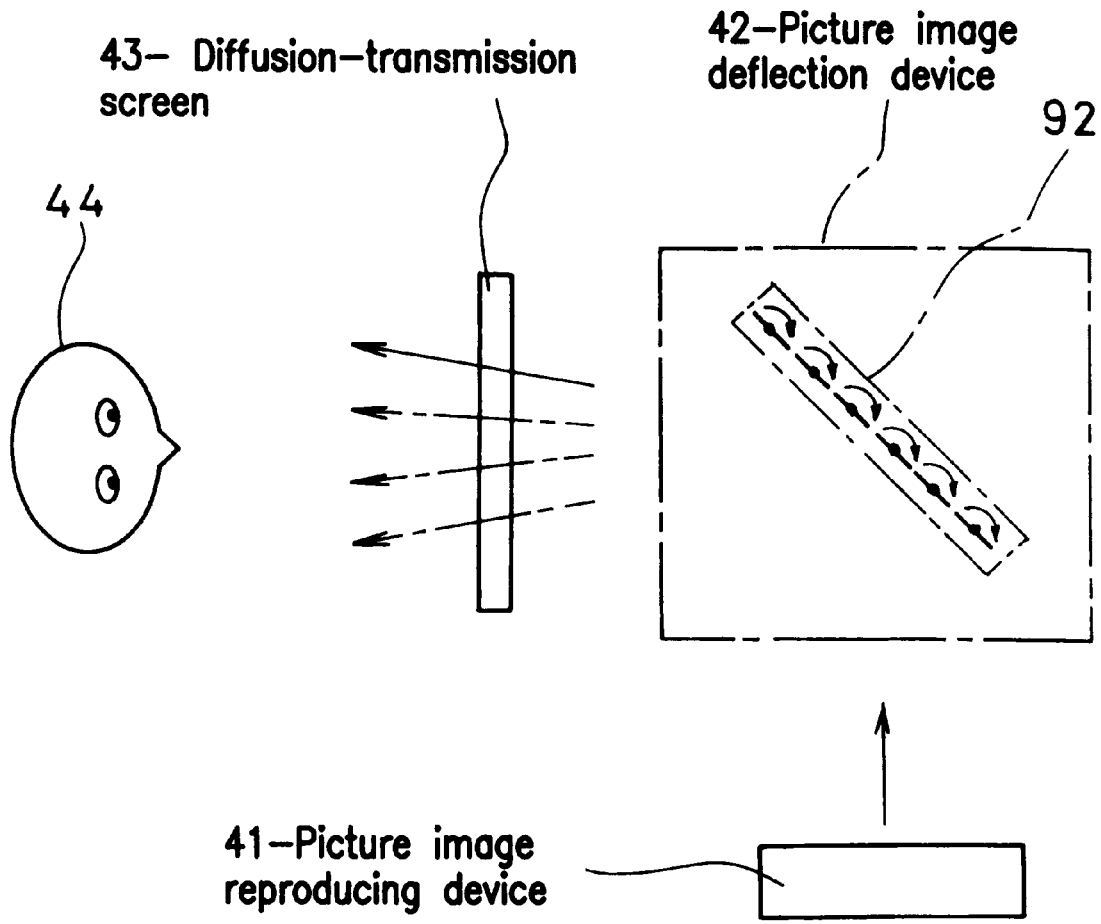
FIG. 5 is a plan view showing another embodiment of the picture image deflection device used in the three-dimensional picture image display apparatus which deflects picture images by a mechanical system.

Next, the relation between the deflection angle of the output images and the visible areas is described. FIG. 5 shows the visible areas when four output images are deflected in the different directions corresponding to the directions in which the picture images are picked up. If the picture images are outputted without deflection, the visible areas of respective output images are completely overlapped in the rear of the screen. On the other hand, when the deflection angles of the output images are increased, the visible areas 50a, 50d of the first and fourth output images will not be overlapped on the area designated by numeral 51d. Thus, the area where the visible areas 50a to 50c or 50b to 50d are overlapped will be the place where the displayed three-dimensional picture image can be seen the most natural. If the deflection angles are made much larger, the area where the visible areas are overlapped will not be existed. Finally, four independent visible areas will be exist.

The above-mentioned explanation is described referring to the example of four output images. In general, when the number of deflected output images is N, the largest number of divided areas responding to the overlap of the visible areas will be (2N−1). For example, when the number N equal four, the divided area is seven. The area where the N visible areas are overlapped will be the area where the multiplicity is the highest (in the above-mentioned example, the multiplicity of four is the highest).

For working the wavefront reproduction effect which is one of important effect for generating the natural three-dimensional feeling in the three-dimensional picture image display apparatus of this invention, it is desirable that the deflection angles of N output images are selected so that the visible areas are divided into (2N−1) areas responding to the multiplicity of the overlap of the N visible areas. Furthermore, it is desirable that the area where the N visible areas are overlapped is contained in the divided areas.

For example, when the observer watches the output images from a point somehow apart from the screen as shown in FIG. 3, the deflected picture images which are overlapped responding to the position of the eyes are observed. Thus, the multiplicities of the overlap of the output images are perceived differently by the right and left eyes. As a result, the observer perceives the three-dimensional picture image having a smoothly curved surface which is generated by continuously connected and overlapped picture images. At this time, when the area of maximum multiplicity of the overlap is existed in the overlapped regions, the wavefront reproduction effect is effectively worked and the natural three-dimensional picture image can be observed. If the divided areas respectively have substantially the same area, the observer can perceive the picture image informations continuously without unnatural feeling, even when the observer moves the positions of the eyes. Thus, the kinetic parallax can be used effectively.

If the number of the divided areas responding to the multiplicity of the overlap of the visible areas are not set to be (2N−1), the wavefront reproduction effect can not be worked effectively. Thus, the observer perceives only the duplication of discontinuous two-dimensional picture images, so that it is impossible to observe the three-dimensional picture image.

Figure 4:
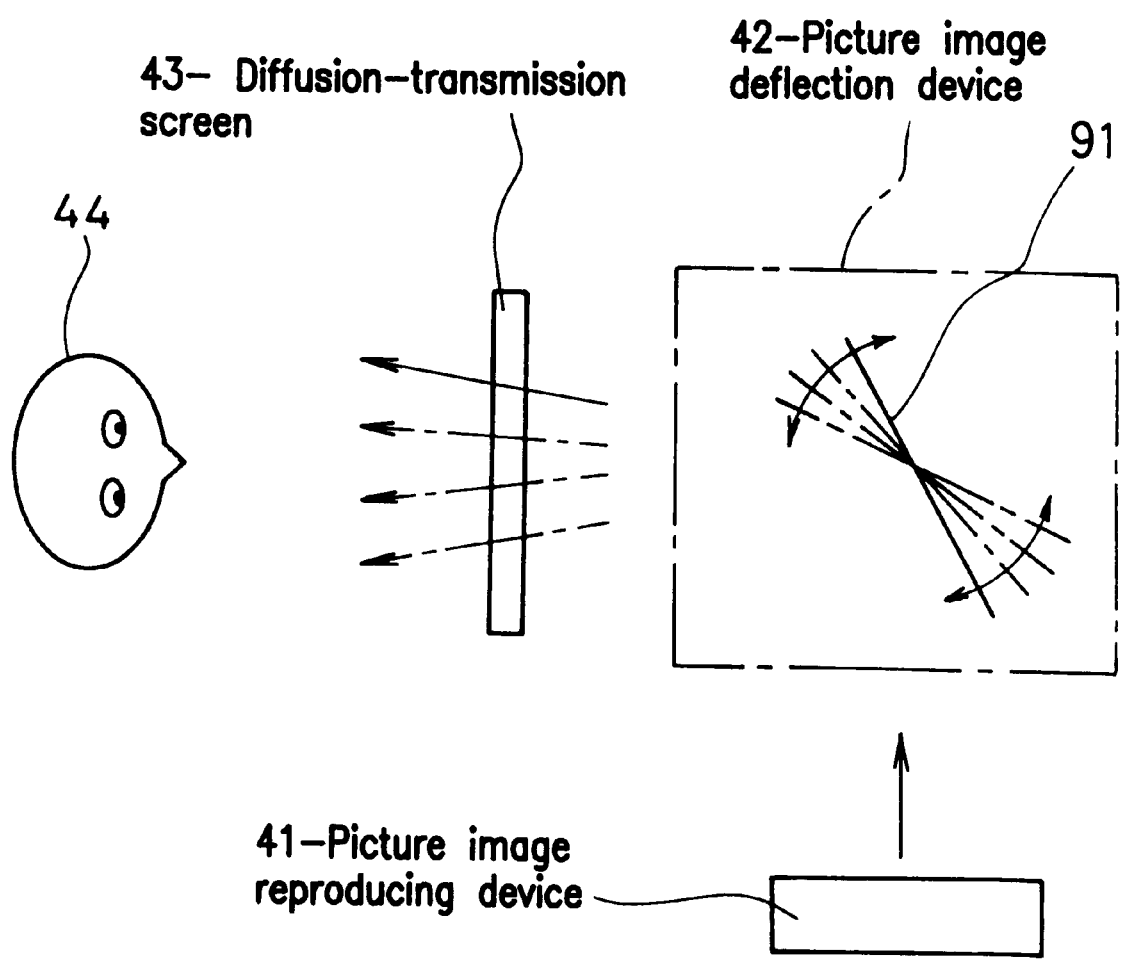
FIG. 4 is a plan view showing an embodiment of a picture image deflection device used in the three-dimensional picture image display apparatus which deflects picture images by a mechanical system.

Next, picture image deflection device 42 in FIG. 2 which deflects a plurality of picked up picture images in a plurality of directions will be described in detail. FIGS. 4 and 5 show an embodiment of a three-dimensional picture image display apparatus disposed with picture image deflection device 42 which deflects picture images by a mechanical system.

In FIG. 4, picture images displayed sequentially one by one at a predetermined time interval by picture image reproducing device 41 are deflected by changing reflective positions of the picture images through a movable mirror 91 being vibrated and are displayed on diffusion-transmission screen 43.

Examples of movable mirror 91 are galvano mirrors which can be operated electrically or mechanically. For example, as shown in FIG. 5, the same effect as in FIG. 4 can be attained by using a compact mirror 92 being divided in microstrips as movable mirror 91. It may also be configured such that the compact mirror 92 being divided in microstrips is applied around a cylindrical objective. By rotating these compact mirrors 92, the picture image can be deflected, so three-dimensional picture images can be displayed on diffusion-transmission screen 43 etc.

Figure 6:
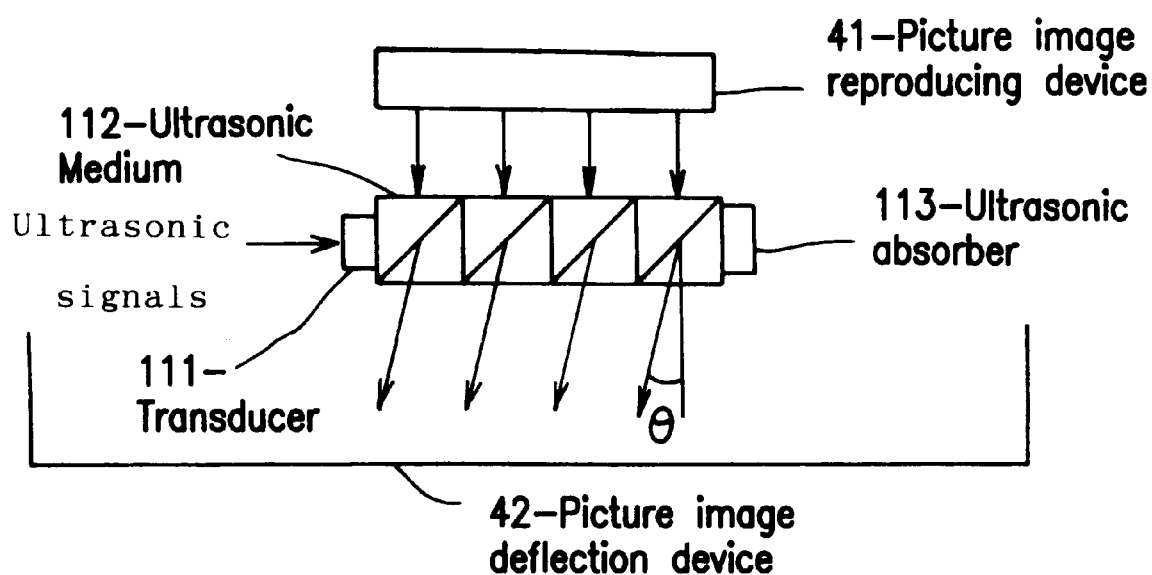
FIG. 6 is a sectional view showing still another embodiment of the picture image deflection device of the three-dimensional picture image display apparatus of this invention which deflects picture images to a plurality of directions through changing a refractive index of a light transparent medium.

FIG. 6 shows another embodiment of a three-dimensional display apparatus of this invention which is disposed with picture image deflection device 42 deflecting picture images to a plurality of directions through changing a refractive index of a light transparent medium.

As for methods to change a refractive index of a transparent medium, for example, an electrical optical effect can be used to change the refractive index by inputting an electrical signal, or an acoustic optical effect can do it by inputting an acoustic wave, and there is also an optical effect which can change the refractive index by a light radiation. There methods are preferable in comparison with the above-mentioned methods using mirrors because there is no mechanically movable part involved. As a result, along with improvement in reliability, a light and compact apparatus can be attained.

As an example of element which shows a refractive index change in a light transparent medium, FIG. 6 shows an embodiment in which picture images are deflected through a refractive index change in an acoustic optical element with use of an acoustic optical effect (hereinafter called as AO device). Picture image deflection device 42 which deflects the picture images displayed sequentially one by one at a predetermined time interval on picture image reproducing device 41 is comprised of a transducer 111 for transmission of ultrasonic signals, an ultrasonic medium 112 where a refractive index distribution occurs, and an ultrasonic absorber 113. Generally, transducer 111, ultrasonic medium 112, and ultrasonic absorber 113 are called as AO device as a whole.

When transducer 111 is used to impress an ultrasonic signal to ultrasonic medium 112, a refractive index change in accordance with this signal occurs within ultrasonic medium 112, thereby achieving the same function as with a phase diffraction grating. When ultrasonic medium 112 is provided with the refractive index distribution in the sawtooth form shown in FIG. 10, picture images as incident light from picture image reproducing device 41 are deflected in a certain angle direction according to the sawtooth wave form. Since an deflected angle $\Theta$ becomes larger along with a pitch of the sawtooth becoming smaller, the deflected angle $\Theta$ can be made larger by increasing a frequency of the ultrasonic signal impressed to transducer 111. On the contrary, the deflected angle 0 becomes smaller by reducing the frequency of the ultrasonic signal.

In this way, by changing the frequency of the ultrasonic signal impressed to transducer 111, a pitch of the sawtooth can be controlled, so the deflected direction can be determined optionally.

Furthermore, by displaying only picture images picked up by a specific image pickup device from one direction in picture image reproducing device 41 without impressing the ultrasonic signal to transducer 111, a normal two-dimensional picture image display can be achieved as well.

In addition, a use of material having a large refractive index difference for ultrasonic medium 112 can reduce a thickness of ultrasonic medium 112 and can lighten the medium. Therefore, it is preferable to use a material causing a large refractive index difference. Examples of the material having a large refractive index difference are dense flint glass, fused quartz, $TeO_2$, $LiNbO_3$, and $Pb_2MoO_5$. Also, these materials are capable of a high speed response as far as about several tens of MHz and are useful because they can attain light transmissivity in an amount of 90 percent or higher. For example, when $LiNbO_3$ is used for transducer 111, several hundreds of MHz can be driven. As for ultrasonic absorber 113, it is preferable to use, for example, dense flint glass, fused quartz, $TeO_2$, and $Pb_2MoO_5$.

In FIGS. 12(a) to 12(c), 13, 14(a) and 14(b), an example of a system will be explained in which liquid crystal is used as light transparent medium and a refractive index change is caused by inputting an electrical signal. Examples of the liquid crystal are nematic liquid crystal, ferroelectric liquid crystal, antiferroelectric liquid crystal, dynamic scattering mode liquid crystal, polymer dispersion liquid crystal etc. First, a glass substrate and a spacer are used to construct prismatic transparent cells 121 and 125 shown in FIG. 12(a). On two sides of the prismatic cell, transparent electrodes (e.g., ITO) 122 to 124 were formed allover. These prismatic cells 121 and 125 are combined to form a rectangular-structured picture image deflection device.

Signals used for impressing the above-noted picture image deflection device are frequency, phase, or a pair of voltage wave form having different amplitudes. FIG. 12(b) shows an example of an impressed voltage signal in a chopping wave form whose phase was different from each other at 180 degrees.

Figure 12A:
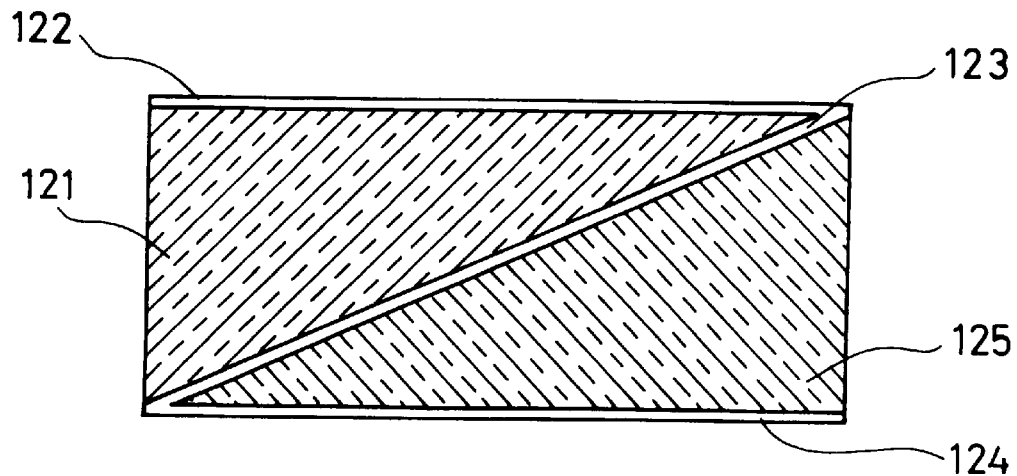
FIG. 12(*a*) is a sectional view showing still another embodiment of the picture image deflection device used in the three-dimensional picture image display apparatus of this invention.
Figure 12B:
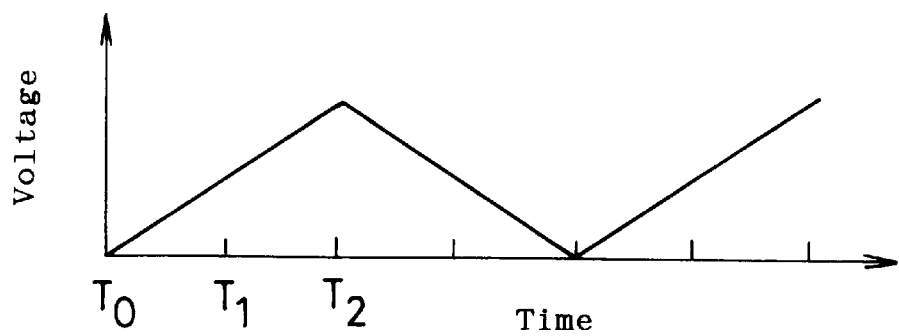
Figure 12C:
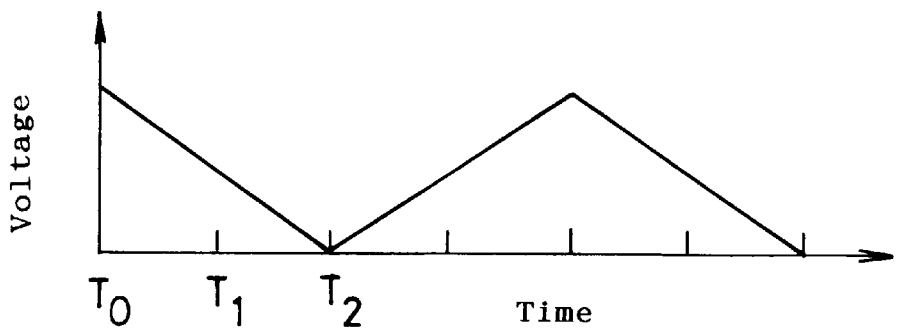

Transparent electrode 123 serves as a common electrode, and a signal voltage shown in FIG. 12(b) was impressed to transparent electrode 122, and two signal voltages in FIG. 12(c) was impressed to transparent electrode 124. It was assumed that an input light is coming from the side of transparent electrode 122.

At time T0 in FIG. 12(b), voltage is not impressed to trasparent electrode 122, while transparent electrode 124 is in a state of impressed voltage. At this time, since prismatic cell 121 is not impressed with voltage, a refractive index of the liquid crystal shows no change. On the other hand, a refractive index of prismatic cell 125 decreases by the impressed voltage from a refractive index of extraordinary light (ne) to a refractive index of ordinary light (no). As a result, due to the difference in the refractive indexes of prismatic cell 121 and 125, the input light is deflected in the direction of output image 1 in FIG. 4.

At time $T_1$, since voltage impressed to prismatic cell 121 and 125 is equal and the refractive index of the liquid crystal is equal, the input light permeated prismatic cell 121 and 125 in the same direction as the incident direction.

Next, at time $T_2$, voltage was impressed to prismatic cell 121, but prismatic cell 125 was in a state of impressed voltage. In other words, this was a reverse state of time $T_0$, and therefore, the input light was deflected to the direction of output 4 in FIG. 2.

During the time inbetween, the picture images were to be deflected in an optional direction between output images 1 to 4 in FIG. 2. In other words, by impressing the signal voltages shown in FIG. 12(b) to prismatic cell 121 to 125 shown in FIG. 12(a), the input picture images can be deflected in an optional direction shown in FIG. 2.

Figure 13:
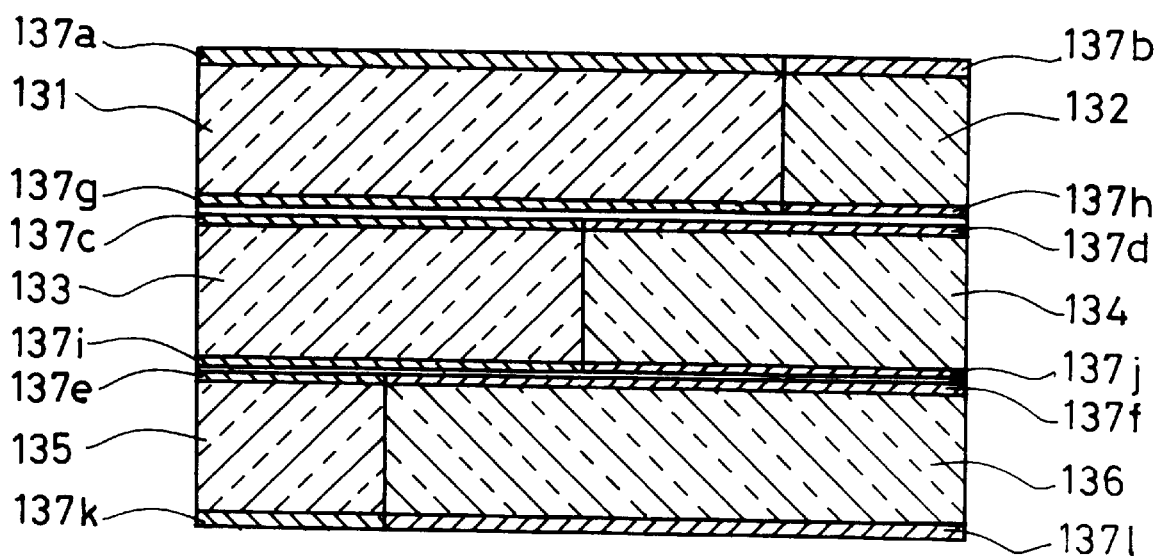
FIG. 13 is a sectional view showing still another embodiment of the picture image deflection device used in the three-dimensional picture image display apparatus of this invention.

FIG. 13 shows a picture image deflection device which was formed by combining small pieces of plane cell 131 to 136 filled with liquid crystal. Transparent electrodes 137g to 137l serve as common electrodes, and the signal voltage shown in FIG. 12(b) was impressed to transparent electrodes 137a, 137c, and 137e. Furthermore, the signal voltage shown in FIG. 12(c) was impressed to trvoltages 138b, 137d, and 137f, thereby deflecting the picture images by the refractive index difference caused by the impressed signal voltage as with the picture image deflection device in FIG. 12(a) mentioned above.

Small pieces of cell 131, 133, and 135 are combined such that lengthes become shorter in order, so the form resembles prismatic cell 121 in FIG. 12(a). By using this kind of small plane cells, a thickness of the cell becomes constant, so field intensity becomes constant when a signal voltage is impressed. Therefore, this embodiment is preferable than the embodiment using the above-noted prismatic cells since homogeneity of the refractive index change improves. In addition, it is possible to use the same assembly process as with a usual liquid crystal panel. Accordingly, the production can be simplified and the controllability of the orientation direction in the liquid crystal can be improved compared with the configuration in FIG. 12(a).

By thinning each cell piece and by increasing a number of cell to be combined, the form can be made closer to the prismatic form, and thus, the picture images can be precisely deflected.

Figure 14A:
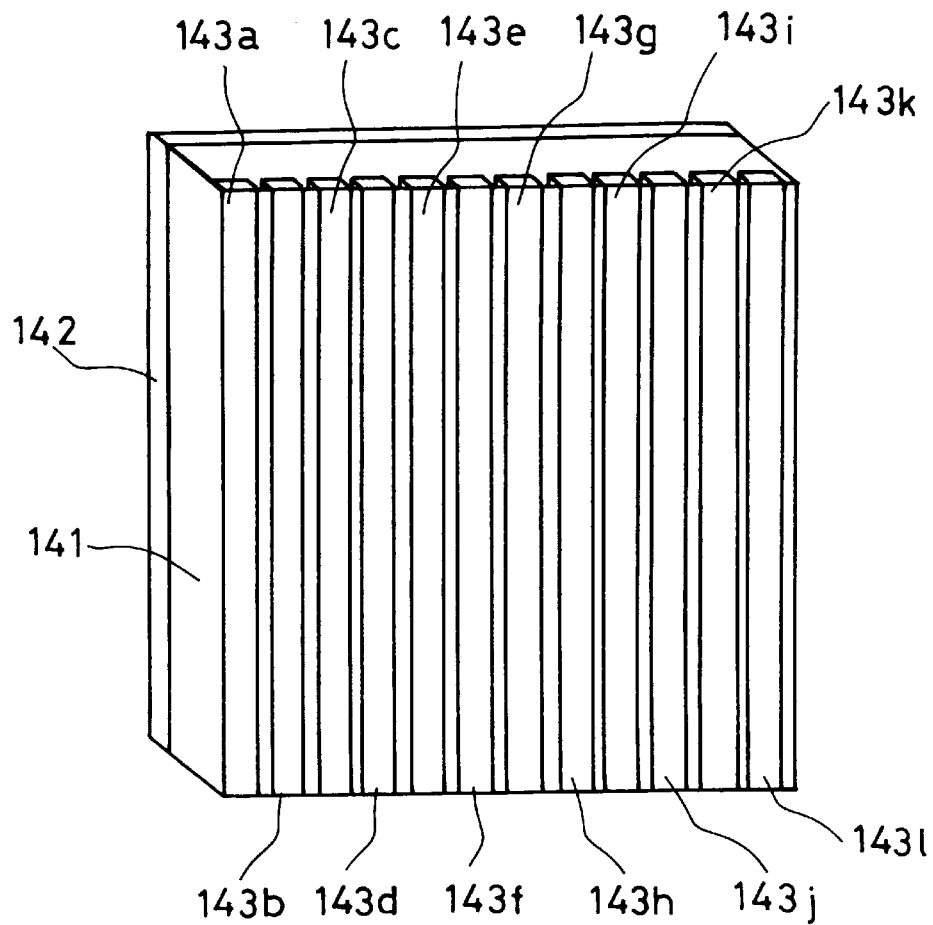
FIG. 14(a) is is a sectional view showing still another embodiment of the picture image deflection device used in the three-dimensional picture image display apparatus of this invention.
Figure 14B:
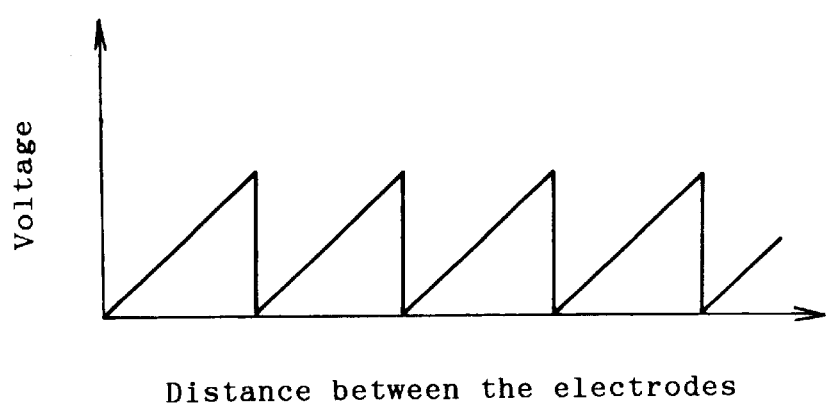
FIG. 14(b) shows the relation between voltage to be applied to the picture image deflection device and distance between electrodes.

FIGS. 14(a) and 14(b) show another embodiment of a picture image deflection device. It is configured such that a totally flat transparent electrode 142 and strip transparent electrodes 143a to 143l are formed in a rectangular liquid crystal cell 141, and that the liquid crystal was filled inside this cell.

Transparent electrodes 143a to 143l in the picture image deflection device mentioned above are impressed with a sawtooth signal voltage wave form shown in FIG. 14(b). At this time, a refractive index distribution in accordance with the voltage wave form occurs within liquid crystal cell 141, so the picture images can be deflected according to the same function as with a phase diffraction grating. In other words, the picture images as incident light are deflected to a certain angle direction corresponding to the sawtooth form. The deflected angle can be determined to a desired optional direction by changing amplitude or frequency of the impressed signal voltage. The picture image deflection device shown in FIG. 14(a) can be configured by using one liquid crystal cell. Therefore, it is easy to manufacture and production cost can be reduced.

As mentioned above, in the three-dimensional picture image display apparatus of this invention, a plurality of two-dimensional picture images are respectively and sequentially picked up by picture image pickup devices 2a to 2d in synchronism with the timing to display or reproduce the picture images on picture image reproducing device 41. Therefore, the picture image data of a plurality of picture images are not necessary to be memorized in the memory at the same time. The capacity of the memory is sufficient to memorize only one picture image data with no relation to the number of the picture image pickup devices. Furthermore, the number of the picture image pickup devices can easily be increased without increasing the capacity of the memory, so that more natural three-dimensional picture image can be displayed or reproduced.

Furthermore, for displaying the picture images which are picked up by the picture image pickup device in real time, it is not necessary to compose new picture image(s) for three-dimensional picture image display from a plurality of picture images by the exclusive signal processing apparatus. Thus, the signal processing device or circuit of this invention can be simplified and the apparatus becomes compact.

In the above-mentioned first embodiment, four picture image pickup devices 2a to 2d are used. However, it is possible to display or reproduce the three-dimensional picture image when the number of the picture image pickup devices is more than two. Furthermore, the diffusion-transmission screen 43 is disposed in the rear of the picture image deflection device 42. However, it is possible to display the three-dimensional picture image by disposing the diffusion-transmission screen 43 in front of the picture image deflection device 42.

Furthermore, two-dimensional picture images of the object is taken by not only a plurality of picture image pickup devices but also one moving picture image pickup device. The moving picture image pickup device picks up the two-dimensional picture images of the objective from several directions. As an illumination for the objective, natural light such as sunlight, an incandescent lamp or a fluorescent lamp is used. However, a light source of single wavelength can be used in a specific case.

Second Embodiment

Figure 7:
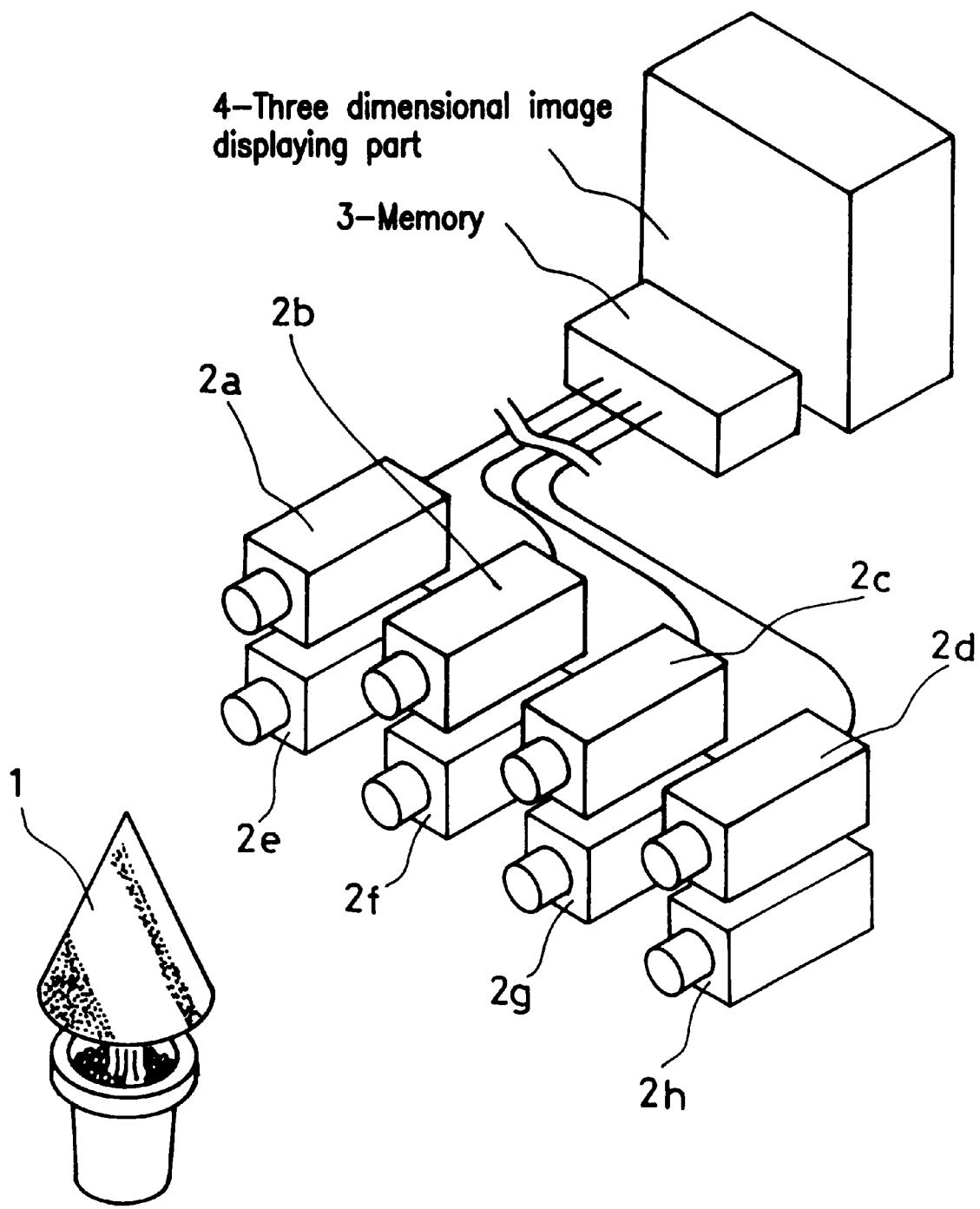
FIG. 7 is a perspective view showing a configuration of a second embodiment of a three-dimensional picture image display apparatus of this invention.

A second embodiment of a three-dimensional picture image display apparatus of this invention will be described with reference to FIG. 7. FIG. 7 shows positions of an object 1 to be recorded and reproduced and a plurality of image pickup devices 2a to 2h.

In the above-mentioned example shown in FIG. 1, the picture image pickup devices 2a to 2d are disposed in the horizontal direction. Thus, the three-dimensional picture image display apparatus shown in FIG. 1 does not have a function for three-dimensional displaying in the vertical direction. For displaying the natural three-dimensional picture image in the horizontal and vertical directions, it is preferable that a plurality of picture image pickup devices 2a to 2h are two-dimensionally arranged shown in FIG. 7. In FIG. 7, eight picture image pickup devices 2a to 2h are arranged as 2×4 arrays. However, it is possible to dispose the picture image pickup devices 2a to 2h with an even distance or uneven distances. Furthermore, it is possible to increase the number of the image pickup devices for arranging the matrix of 5×3, 4×8, 10×10 and so on.

When the picture image pickup devices 2a to 2h are two-dimensionally arranged, the picture images displayed on the picture image reproducing device 41 shown in FIG. 2 will be deflected in the horizontal and vertical directions responding to the direction in which the picture image was picked up. Therefore, even when the observer moves to an optional position in the horizontal and/or vertical direction (s), the observer can perceive the three-dimensional picture images responding to the movement. As a result, substantially perfect three-dimensional view without no relation to the observation position can be achieved.

Third Embodiment

Figure 8:
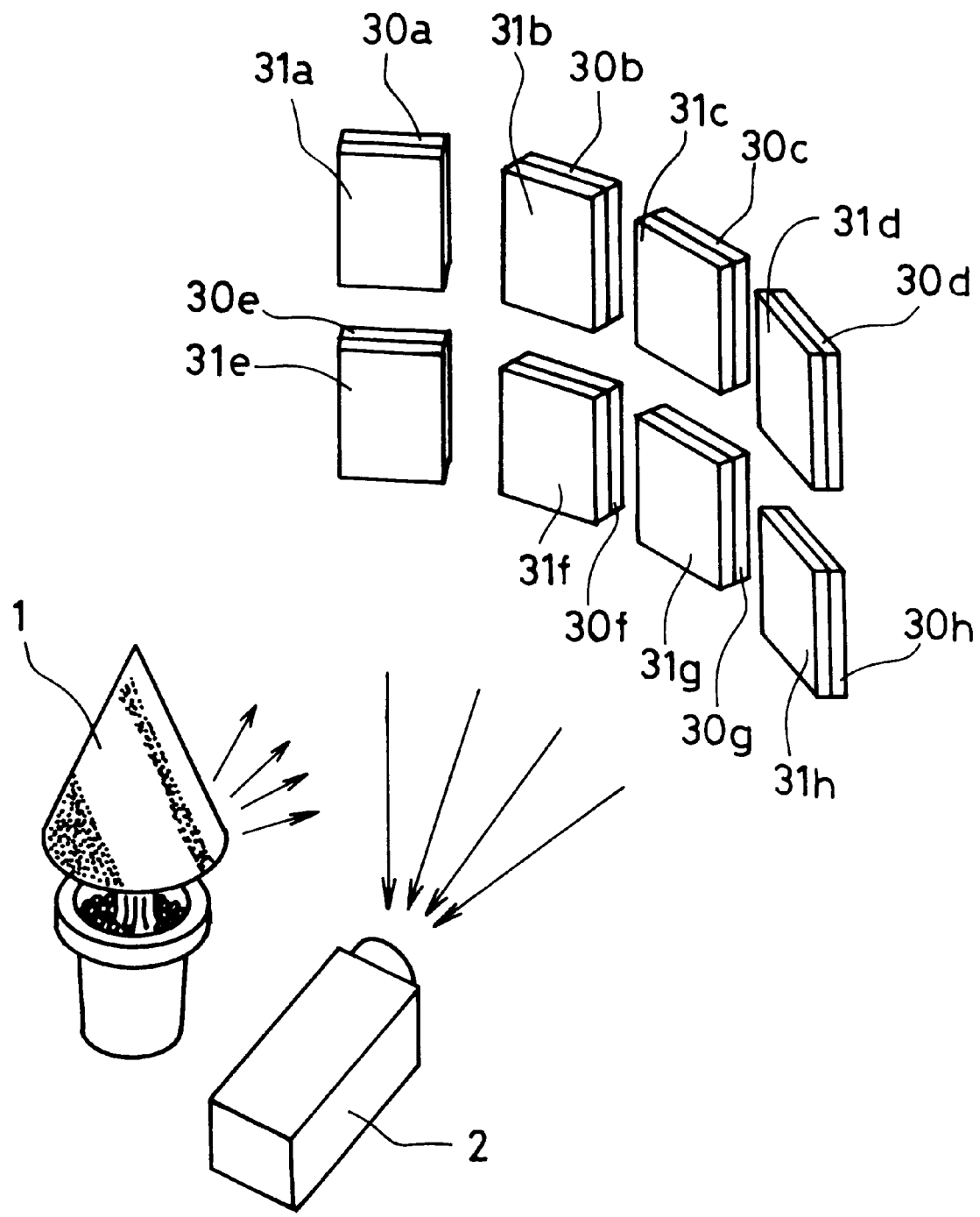
FIG. 8 is a perspective view showing a configuration of a third embodiment of a three-dimensional picture image display apparatus of this invention.

A third embodiment of a three-dimensional picture image display apparatus of this invention will be described with reference to FIG. 8. FIG. 8 shows positions of an object 1 to be recorded and reproduced, a picture image pickup device 2 and a plurality of mirrors 30a to 30h.

As shown in FIG. 8, mirrors 30a to 30h are two-dimensionally arranged on circular lines so that multiple light beams from a three-dimensional objective 1 are respectively reflected to the picture image pickup device 2 by mirrors 30a to 30h. In FIG. 8, eight mirrors 30a to 30h are arranged as 2×4 arrays. However, it is possible to dispose the mirrors 30a to 30h with an even distance or uneven distances. Furthermore, it is possible to increase the number of the mirrors for arranging the matrix of 6×4, 5×9, 20×20 and so on.

Furthermore, shutters 31a to 31h are respectively disposed in front of mirrors 30a to 30h. As the shutter 31a to 31h, a mechanical shutter for opening and closing the surface of the mirror or a transmittance changeable shutter can be used. The transmittance changeable shutter is a liquid crystal shutter using twist nematic liquid crystal, ferroelectric liquid crystal, antiferroelectric liquid crystal, dynamic scattering mode liquid crystal and so on.

When shutters 31a to 31h are respectively controlled to be changed the transmittance sequentially in a predetermined time period, the light beams from object 1 reflected by mirrors 30a to 30h will reach to picture image pickup device 2 sequentially at a predetermined timing. Hereupon, a picture image obtained from the light beam reflected by the mirror 30a corresponds to the picture image obtained by the picture image pickup device 2a in FIG. 7 Similarly, the picture images obtained from the light beams reflected by the mirrors 30b to 30h respectively correspond to the picture images obtained by the picture image pickup devices 20b to 20h in FIG. 2. A plurality of mirrors are used instead of using a plurality of the picture image pickup devices, the cost for making the three-dimensional picture image display apparatus can be reduced largely.

Fourth Embodiment

Figure 9:
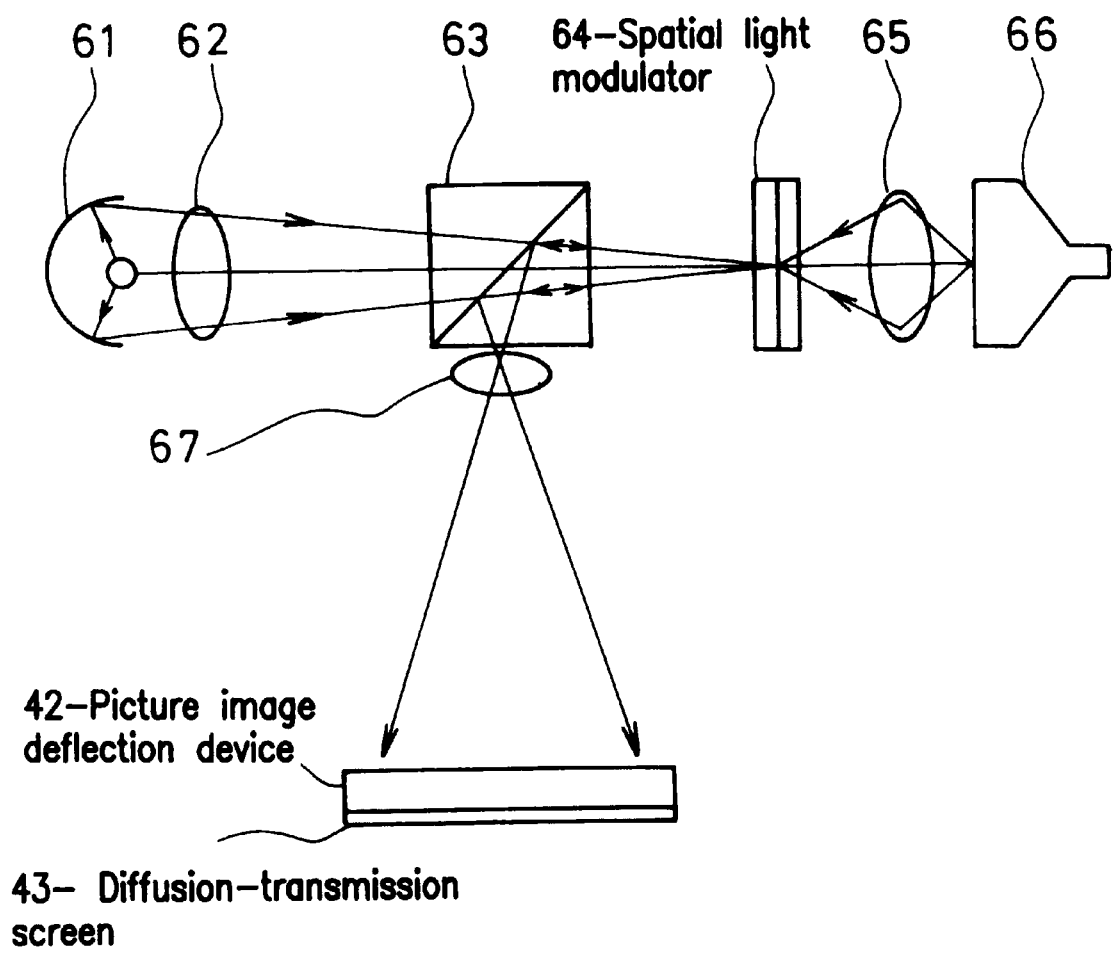
FIG. 9 is a sectional view showing a configuration of a fourth embodiment of a three-dimensional picture image display apparatus of this invention.

A fourth embodiment of a three-dimensional picture image display apparatus of this invention will be described with reference to FIG. 9. FIG. 9 shows another embodiment of a three-dimensional display apparatus of this invention in which an intensity modulation medium was used for picture images. As shown in FIG. 9, picture images displayed in a picture image reproducing device 66 are formed by a focusing lens 65 on one side of a spatial light modulator 64. Spatial light modulator 64 is comprised of a light information writing side and a light information readout side in a separate form. Furthermore, it serves for a transfer of written picture images to the readout side after modulating their intensity.

Light from a light source 61 is converged by a condenser lens 62 and then radiated to one side of spatial light modulator 64 through a beam splitter 63. The reflected light therefrom is reflected once more by beam splitter 63 which is further projected to picture image deflection device 42 through a projection lens 67.

Spatial light modulator 64 is comprised of a light information writing layer and a light information readout layer in a separate form. Here, when a highly precise reproducing element is used for picture image reproducing device 66 and when light source 61 with high luminance is used, picture images projected to image deflection device 42 through spatial light modulator 64 become highly precise and highly bright.

In this way, by using spatial light modulator 64 as the intensity modulation medium of the picture images, both higher precision and higher luminance can be attained at the same time which was considered as difficult in the past. As a result, picture images which are enlarged and projected by projection lens 67, for example, show no deterioration in their picture quality, and clear and bright picture images can be attained.

Fifth Embodiment

Figure 10:
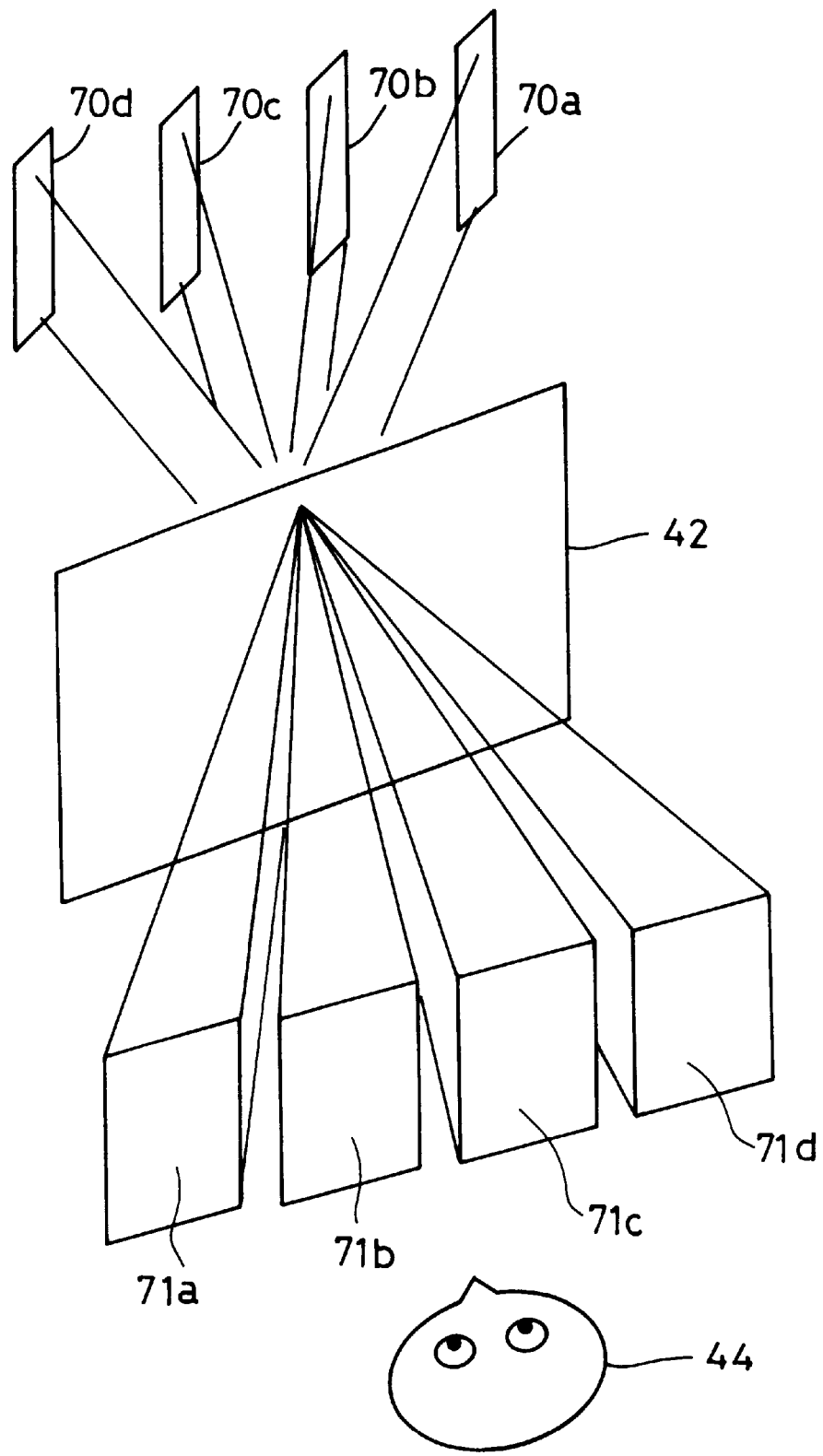
FIG. 10 is a perspective view showing a configuration of a fifth embodiment of a three-dimensional picture image display apparatus of this invention.
Figure 11:
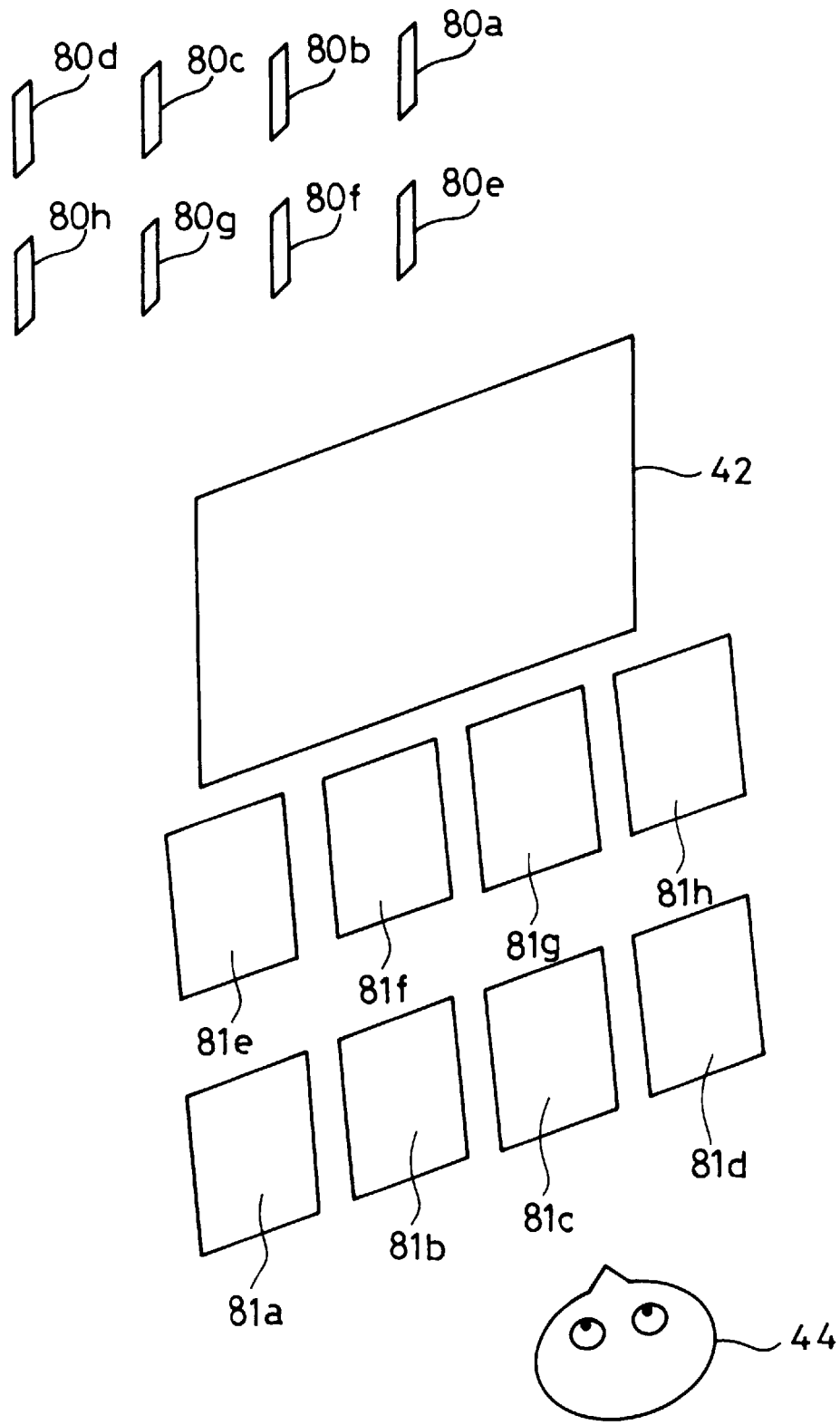
FIG. 11 is a perspective view showing another configuration of the fifth embodiment of a three-dimensional picture image display apparatus of this invention.

A fifth embodiment of a three-dimensional picture image display apparatus of this invention will be described with reference to FIGS. 10 and 11. FIGS. 10 and 11 show other embodiments of this invention in which an one-dimensional picture image reproducing device is used for reproduction.

In FIG. 10, an one-dimensional picture image reproducing devices 70a to 70d are comprised of a plurality of light emitting diode in a combined form, a cathode ray tube, an electro-luminescence, and a liquid crystal reproducing element (twist nematic liquid crystal, ferroelectric liquid crystal, antiferroelectric liquid crystal, dynamic scattering mode liquid crystal etc.), and one-dimensional picture image reproducing devices 70a to 70d are disposed in the horizontal direction. At this time, one-dimensional patterns of a part corresponding to each row in two-dimensional picture images are displayed sequentially one by one at a predetermined time interval in one-dimensional reproducing device 70a which are then deflected and displayed by picture image deflection device 42 in the horizontal direction in synchronism with each light emitting pattern. Although it is omitted in FIGS. 10 and 11, diffusion-transmission screen 43 shown in FIG. 2 may be disposed in front and in the rear of picture image deflection device 42.

At this moment, an output image 71a observed by an observer 44 is the two-dimensional pattern which is the one-dimensional pattern of the vertical direction expanded in the horizontal direction through an afterimage effect of eyes. A direction where output image 71a is observed is determined by the position of one-dimensional reproducing device 70a and picture image deflection device 42. In other words, output image 71a is displayed in the extended direction of a line segment which connects one-dimensional reproducing device 70a and the center of picture image deflection device 42.

The same step can be repeated for one-dimensional reproducing devices 70b to 70d. First, a three-dimensional objective is picked up from different directions in two-dimensional picture images and is displayed sequentially at a predetermined time interval for each row, and then, the images are deflected through picture image deflection device 42 to be displayed as output images 71b to 71d. At this time, one-dimensional reproducing devices 70a to 70d are disposed against picture image deflection device 42 in such a way that the picture images displayed respectively in one-dimensional reproducing devices 70a to 70d correspond to directions being picked up.

When observer 44 watches these output images 71a to 71d, a three-dimensional image as described in FIGS. 2 and 3 can be observed naturally owing to the same effect mentioned above. Furthermore, this system is comprised of the one-dimensional reproducing devices only, so there are advantages that the device can be simply-structured and of a compactsized, and that the manufacturing costs can be reduced as well.

In FIG. 10, a stereoscopic vision in the vertical direction is not available since one-dimensional reproducing devices 70a to 70d are positioned only in the horizontal direction. In order to provide natural three-dimensional picture images including the vertical direction in addition to the horizontal direction, FIG. 11 shows an embodiment in which one-dimensional reproducing devices 80a to 80h are arranged two-dimensionally. Although FIG. 11 shows 8 pieces of one-dimensional reproducing devices disposed in 2×4 arrays, the number of the devices may be increased and arranged optionally in 5×3, 4×8, and 10×10 arrays. When one-dimensional reproducing devices 80a to 80h are arranged two-dimensionally in this way, picture images are output in the both horizontal and vertical directions corresponding to each reproducing device and a position of picture image deflection device 42. In other words, a picture image of one-dimensional reproducing device 80a corresponds to output image 81a, and picture images of the following one-dimensional reproducing devices 80b to 80h correspond respectively to output images 81b to 81h. Therefore, even if observer 44 moved horizontally or vertically to an optional position, a stereoscopic image in accordance with this movement could be perceived in both right-left and up-down directions. As a result, independently of an observation position, a perfect stereoscopic vision can be attained.

Sixth Embodiment

FIG. 15 shows another embodiment of a three-dimensional picture image display apparatus of this invention in which picture image reproducing devices 151 to 154 positioned circularly are combined with shutters 155 to 158 driven at a predetermined time interval. This system deflects a plurality of picture images in a plurality of directions by positioning a plurality of picture image reproducing devices 151 to 154 in advance in desired output directions.

Although FIG. 15 shows as an example four pieces of picture image reproducing devices 151 to 154 disposed in the horizontal direction, it is enough to dispose at least two of picture image reproducing device 151 to 154, and also two-dimensionally instead of in the horizontal direction.

A picture image displayed in picture image reproducing device 151 is the picture image picked up by an image pickup device 2a in FIG. 1, and picture images picked up by image pickup devices 2b to 2d are displayed in the order of picture image reproducing devices 152 to 154.

Examples of picture image reproducing devices 151 to 154 are CRT, plasma display, liquid display element as in FIG. 1.

Shutters 155 to 158 can be configured as a mechanical switch type and a transmittance changable type. The transmittance changable shutter is a liquid crystal shutter using, for example, twist nematic liquid crystal, ferroelectric liquid crystal, dynamic scattering mode liquid crystal etc.

A switch time of the shutter is determined within a time (less than 1/30 second) in which an afterimage effect of human eyes can be preserved. By opening and closing shutters 155 to 158 at a predetermined time intervals, the picture images displayed in picture image reproducing devices 151 to 154 are input in order on diffusion-transmission screen 43 in specific directions, thereby displaying a three-dimensional image on diffusion-transmission screen 43.

As described above, a three-dimensional picture image display apparatus of this invention satisfies four factors of stereoscopic vision simultaneously, that is, binocular parallax, kinetic parallax, spatial screen effect, and three-dimensional wave front reproduction effect. Therefore, comparing this system with conventional systems using spectacles or lenticular lens where the systems were dependent solely on one of these factors of stereoscopic vision, it is possible to perceive even more natural three-dimensional picture images as if the real object were there and observed.

A three-dimensional picture image pickup method of this invention uses a plurality of image pickup device to pick up images of an object sequentially one by one at a predetermined time interval, or uses a plurality of mirrors as a means to divide the object sequentially at a time interval for picking up images in a single image pickup device. As a result, projected images of the object can be obtained sequentially at a predetermined time interval in any method.

Accordingly, when certain picture images are displayed in the three-dimensional picture image display apparatus, a memory part to memorize one sheet of picture image is no longer necessary, or a special picture image processing device such as picture image processing circuit which was dedicated to synthesizing picture images for a three-dimensional use is no longer necessary. In this way, a simplified inexpensive system can be attained.

In particular, the effect is enormous if a plurality of picture images is applied to a three-dimensional picture image display apparatus of this invention disposed with a means of reproducing a plurality of picture images at a predetermined time interval and a means of deflecting these picture images in a plurality of directions.

This invention will be described with reference to the following experiments.

Experiment 1

Figure 16A:
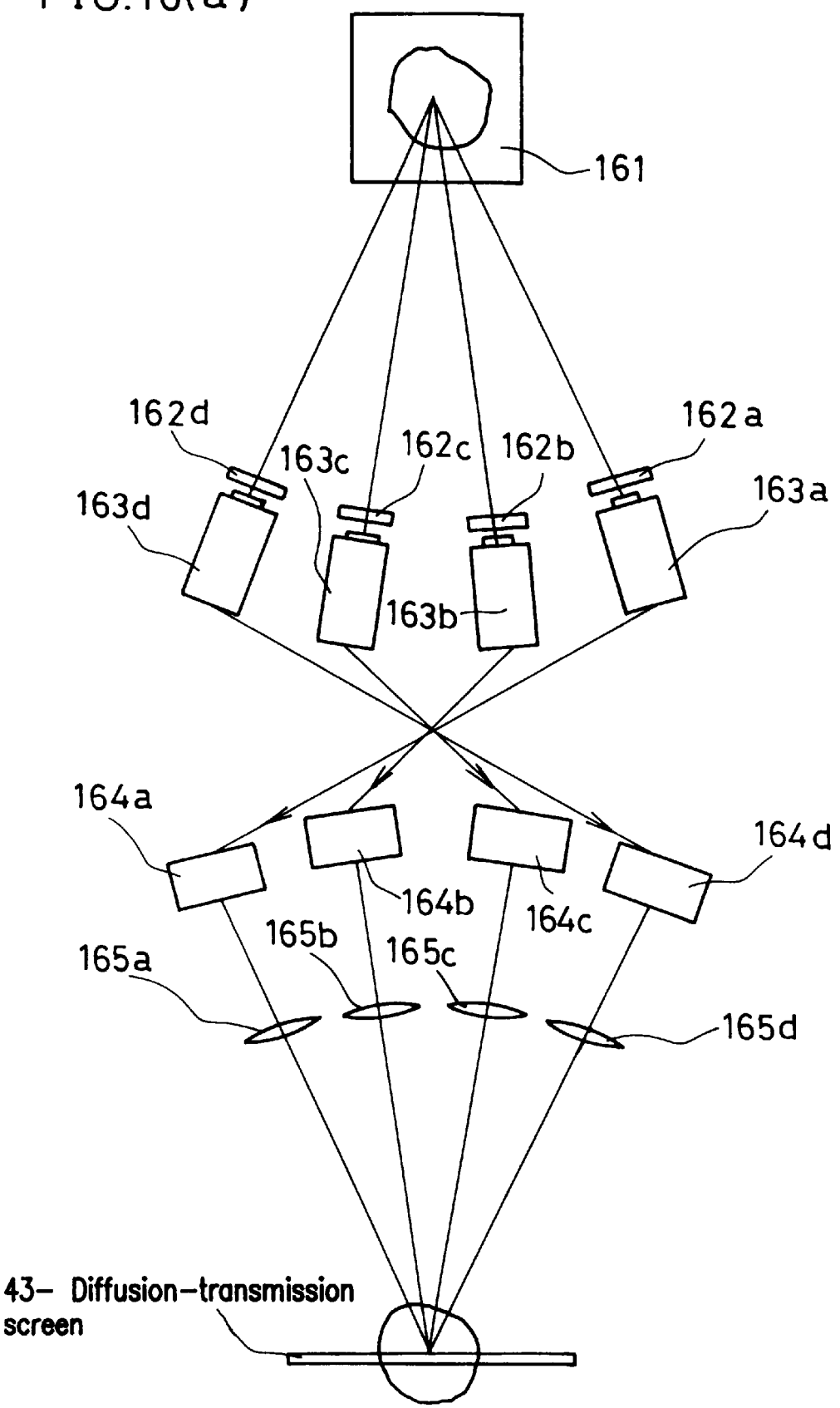
FIG. 16(a) is a plan view showing a configuration of an optical system used to check an effect of stereoscopic vision of the three-dimensional picture image display apparatus of this invention.
Figure 16B:
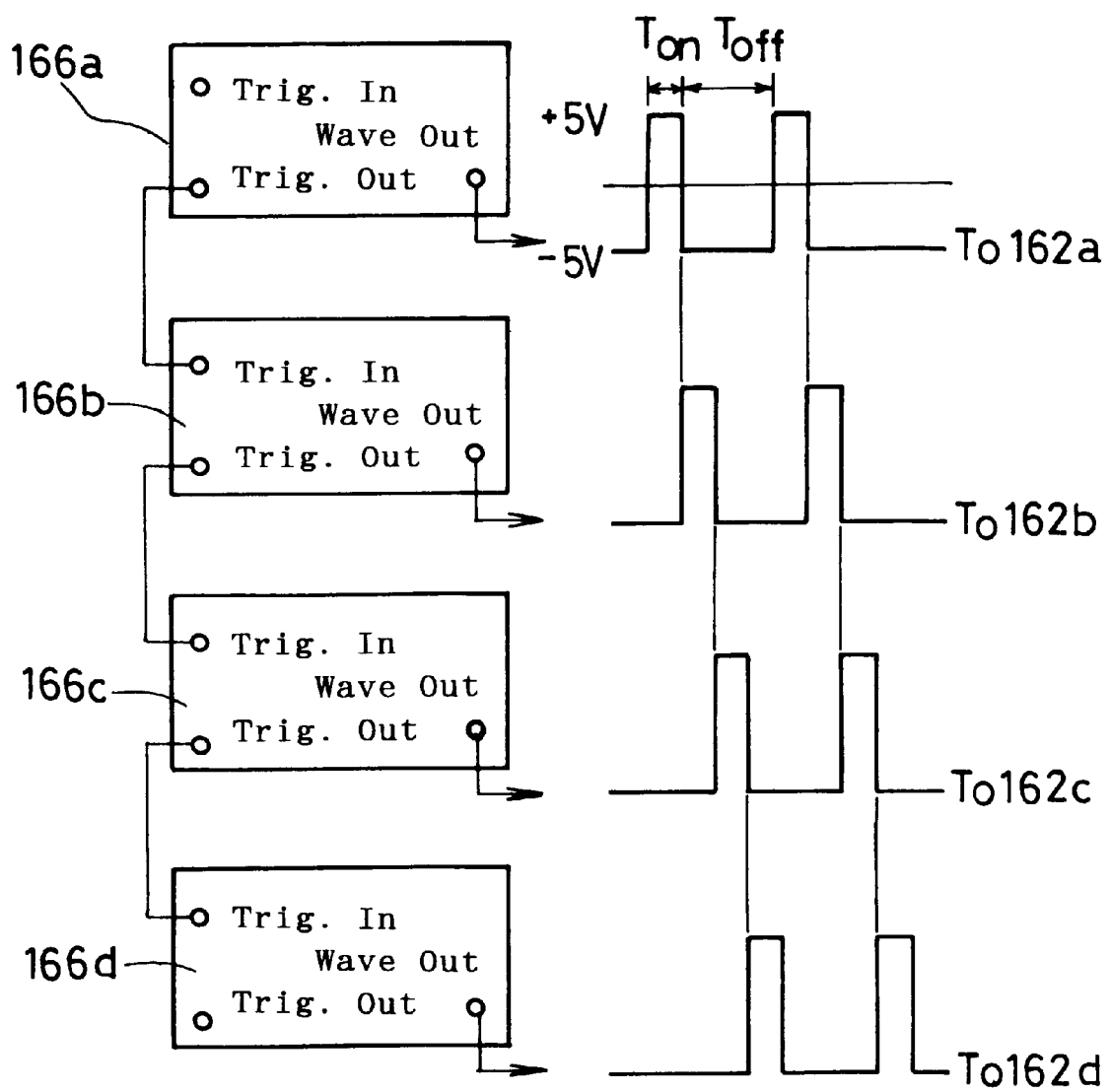
FIG. 16(b) shows signals to be applied to the optical system shown in FIG. 16(a)

An optical system shown in FIGS. 16(a) and 16(b) is used to check an effect of stereoscopic vision of a three-dimensional picture image display apparatus of this invention.

In order to pick up images of a three-dimensional objective 161 multidirectionally, four pieces of solid state imaging devices (CCD camera) 163a to 163d are positioned circularly at an interval of eight degrees in equidistant of 80 cm from the three-dimensional objective. Picture images were picked up multidirectionally in sequence at a predetermined time interval, and when these picture images were displayed, liquid crystal shutters 162a to 162d composed of ferroelectric liquid crystal were placed in front of CCD cameras 163a to 163d to check the three-dimensionality.

A projection system comprising four pieces of CRT 164a to 164d with an opposite angle of six inches was positioned at an interval of eight degrees to correspond to the image pickup system in equidistance of 120 cm from a screen. Furthermore, four pieces of lens 164a to 165d with a focal length of 300 mm and a diameter of 82 mm were placed 50 cm in front of each CRT. It was adjusted such that picture images displayed in each CRT formed the images on the screen. Here, the screen had an opposite angle of twelve inches. Picture images of the three-dimensional objective symmetrically picked up from different angle directions by CCD cameras 163a to 163d were respectively input directly to CRT 164a to 164d for displaying them on the screen.

Liquid crystal shutters 162a to 162d serve as shutter in that a movement of liquid crystal molecules changes by a polarity of the applied voltage, and that light transmissivity is changed by this effect. The liquid crystal shutters were driven by using four pieces of pulse generators 166a to 166d, synchronizing them with external triggers, and by connecting each to cascades.

First, an experiment was conducted to examine an effect of binocular parallax as a factor in the streoscopic vision by using a random dot stereogram shown in FIGS. 17(a) and 17(b). This stereogram is comprised of black and white random dots, and although a right eye pattern 172 is a duplicate of a left eye pattern 171, it Is formed such that a square area in the center is slightly shifted. Thus, when the left eye pattern 171 is correctly perceived with a left eye and the right eye pattern 172 with a right eye, there will be a square window observed in the center of this random dot patterns by a binocular parallax effect. In this way, only the effect of binocular parallax can be examined excluding a factor of stereoscopic vision based on experience.

Concretely, the experiment was conducted as follows. The random patterns for left and right eyes shown in FIGS. 17(a) and 17(b) were displayed simultaneously in two CRT selected from DRT 164a to 164d in FIG. 16(a), and these picture images were observed from behind a diffusion-transmission screen 43 to find out an observation position where the square window can be perceived correctly.

Results of the effects of random dot patterns displayed in CRT 164a to 164d and of the binocular parallax are noted below as ranges in which the square window part was observed.

1) Right eye pattern: CRT 164d. Left eye pattern: CRT 164a.
Observation position: 10 cm to 45 cm behind the central position of the screen. Right and Left: ±2 cm.

2) Right eye pattern: CRT 164d. Left eye pattern: CRT 164b.
Observation position: 10 cm to 40 cm behind the central position of the screen. Right and Left: ±2 cm.

3) Right eye pattern: CRT 164c. Left eye pattern: CRT 164b.
The square window was not observed.

4) Right eye pattern: CRT 164d. Left eye pattern: CRT 164a.
Left eye pattern: CRT 164c.
The square window was not observed.

According to the results mentioned above, 1) shows that there was a large difference in the deflection directions between the two picture images, and that a broad range was created in which the two picture images were perceived independently with the right eye and the left eye in the rear of the screen without overlapping.

On the other hand, 2) shows that there was a smaller difference in the deflected direction between the two picture images in comparison with 1), so a range in which the two picture images can be seen independently became smaller than that of 1). In other words, the square window can be observed on the two random dot patterns on condition that the two patterns enter the right eye and the left eye independently. It can be judged that a range gap in the observation positions resulted in 1) and 2) corresponds to this condition.

Furthermore, 3) shows an even smaller difference in the deflected direction between the two picture images in comparison with 1) and 2). Thus, this result can be judged that there was almost no area where the two picture images could be perceived independently with the right eye and the left eye.

The result of 4) shows that the square window observed in 1) was no longer observed in the same range due to picture images displayed in CRT 164c. This was probably caused by the overlapping picture images by CRT 164c.

It was described in FIG. 3 that the effect of binocular parallax as a factor of stereoscopic vision can be obtained on assumption that there is a visual area shown in rhombus for deflected output picture images. Based on the actual experiment conducted, it was confirmed that the observation positions caused by the binocular parallax are present, and that the overlapping visual area was also present for deflected output picture images. According to these experimental results, a model of the relationship between the deflected angle and the visual area was proved adequate.

Experiment 2

In the optical system shown in FIGS. 16(a) and 16(b), three-dimensional objective 161 used was a doll of about 15 cm in size. Picture images of this doll were picked up from four directions by CCD cameras 163a to 163d which were then formed on diffusion-transmission screen 43 by using the projection system. The images displayed on diffusion-transmission screen 43 were examined with respect to effects such as three-dimensionality and continuity of the picture images when the observation position changed.

As an example of screen having greater transparent characteristics than diffusion characteristics, a polyethylene sheet was used as diffusion-transmission screen 43 in FIG. 16(a). In the area where the effect of binocular parallax in Experiment 1 was confirmed, the doll as object gave the three-dimensionality as if an arm part was sticking out. Furthermore, when the observation position was moved right and left in the area behind this area, the side information corresponding to this was obtained continuously, so the effect of a kinetic visual difference could be confirmed.

Experiment 3

Next, as an example of screen having greater diffusion characteristics than transparent characteristics, a tracing paper was used as diffusion-transmission screen 43. Three-dimensional objective 161 used was a doll which formed the images on diffusion-transmission screen 43 through the same steps of image pickup and projection as in Experiment 2. When the reconstructed images were observed from behind the screen, the stereoscopic images were not perceived. Instead, the images perceived were only plane picture images each reflecting and overlapping. Furthermore, even if the observation position was moved right and left, the images corresponding to this change of position were not obtained.

This is considered as follows. Due to the fact that the diffusion effect of the tracing paper is larger than that of the polyethylene sheet, the picture images were diffused in almost the whole rear area of the screen in an isotropic way. Thus, the visual area having a range shown as the rhombus was not obtained which was available for deflected directions of each picture image shown in the exampel of FIG. 3.

The results of Experiments 2 and 3 proved that the transparent characteristics must be greater that the diffusion characteristics in diffusion-transmission screen 43.

Experiment 4

In the optical system shown in FIGS. 16(a) and 16(b), three-dimensional objective 161 used was a prismatic pedestal, and the steps of image pickup and projection were conducted in a state in which three-dimensional object 161 was placed about 10 cm closer to the CCD camera side than the usual pickup position and the diffusion-transmission screen was placed 20 cm closer to the CRT side than the usual position. A polyethylene sheet of Experiment 2 was used as diffusion-transmission screen 43. At this time, images formed on diffusion-transmission screen 43 were observed from behind the screen.

The observed images were inconsecutive images which looked like four overlapped picture images and they could not be perceived stereoscopically. This was due to the fact that since three-dimensional object 161 and diffusion-transmission screen 43 were shifted from their usual positions, directions of pickup picture images do not correspond to directions of projected picture images respectively. In addition, this result can have its origin in that deflected directions in which a wave front reconstruction effect by each picture image serves effectively is not satisfactory.

As described above, it was proved in the concrete experiment that the deflected directions of the picture images against the three-dimensional object have significant influence upon the three-dimensionality of the reconstructed images.

Experiment 5

In order to examine a stereoscopic effect of picture images picked up and displayed sequentially at a predetermined time interval by CCD cameras 163a to 163d shown in FIG. 16(a), liquid crystal shutters 162a to 162d composed of ferroelectric liquid crystal was used to switch the shutters to ON and OFF.

A driving pulse applied to liquid crystal shutters 162a to 162d was a voltage of ±5 V with a duty ratio of 4:1. During the time when the voltage of ±5 V is applied, the liquid crystal shutter is ON (open), and the CCD cameras can pick up images. As shown in FIG. 16(a), four sheets of liquid crystal shutters 162a to 162d placed in front of CCD cameras 163a to 163d are impressed while a timing of this driving pulse was shifted sequentially by a time offset in a pulse generator.

Contrast characteristics of the liquid crystal shutters were about 10:1. In a pulse timing chart shown in FIG. 16(b), two experiments were conducted for the time impressed with a pulse voltage of ±5 V, namely, for two cases in which time intervals of the liquid crystal shutters were ON in 32 ms or 16 ms.

CCD cameras 163a to 163d used for picking up images as well as CRT 164a to 164d used for projection were arranged such that the image pickup directions correspond to the projected directions as in Experiment 1. In addition, a polyethylene sheet was used as diffusion-transmission screen 43.

In this way, picture images of the three-dimensional objective picked up from different directions were displayed in CRT 164a to 164d sequentially one by one at a predetermined time interval, and images formed on the screen were observed through these picture images which were displayed at a predetermined time internal to examine the stereoscopic effect.

A time interval in which the liquid crystal shutter became ON was set as 32 ms in accordance to the image pickup time of one flame in the CCD camera. When it was displayed sequentially at a time interval, picture images observed on diffusion-transmission screen 43 in FIG. 16(a) flickered strongly and three-dimensionality was not perceived.

Next, a time of the shutter to be ON was set to be 16 ms, and frequency was doubled. When it was displayed at a time interval, the picture images flickered considerably less, and almost the same degree of three-dimensionality obtained in Experiment 2 using a doll object was perceived. It was confirmed that a function of stereoscopic vision was maintained even when displayed at a time interval.

Experiment 6

A three-dimensional picture image display apparatus of this invention shown in FIG. 4 is comprised of a picture image reproducing device 41 consisting of CRT with an opposite angle of 5 inches, a movable mirror 91 consisting of a galvano mirror with an opposite angle of 10 inches, and a diffusion-transmission screen 43 with an opposite angle of 15 inches.

Galvano mirror 91 was positioned 15 cm to 20 cm away from the center of CRT 41, and diffusion-transmission screen 43 was positioned 15 cm to 30 cm away from the center of galvano mirror 91. In CRT 41, picture images which were picked up within 1/60 second by four image pickup devices 162a to 162d disposed in the horizontal direction of FIG. 16(a) were reproduced sequentially at a predetermined time interval.

In synchronism with these reproduced picture images, galvano mirror 91 was modulated through a sawtooth signal voltage having a frequency of 60 Hz and an amplitude of 0 to 10 V, and reflective positions of galvano mirror 91 were determined in accordance with the amplitude of the signal voltage within this periodic time. In other words, four picture images reproduced within 1/60 second at a time interval were deflected and output in four directions according to the reflective positions of the galvano mirror.

In this instance, a deflected angle obtained was −30 degrees to +30 degrees at the maximum. When an observer 44 watched the picture images on diffusion-transmission screen 43, the observed picture images were natural and stereoscopic, and there was no flickering.

Furthermore, a range in which observer 44 can perceive a stereoscopic vision was found to be 10 cm to 2 m in the rear from the front central position of diffusion-transmission screen 43 in the lengthwise direction, and ±50 cm at the maximum in a position of 2 m depth in the horizontal direction.

Within this range, sides of the stereoscopic object could be observed by changing the observation position to right and left. In this way, natural three-dimensional picture images expanding spatially in depth were observed.

Experiment 7

A three-dimensional picture image display apparatus shown in FIG. 10 is comprised of one-dimensional picture image reproducing devices 70a to 70d consisting of 200 pieces of combined LED. A picture image deflection device 42 consisting of a galvano mirror with an opposite angle of 10 inches as in Experiment 6 was used. One-dimensional reproducing devices 70a to 70d were arranged circularly in the range of 5 cm to 30 cm away from picture image deflection device 42 so that a distance became respectively equal measured from the central position of picture image deflection device 42. Although it is not shown in FIG. 10, a lens with a focal length of 50 mm to 200 mm and a diameter of 100 mm to 300 mm was positioned between picture image deflection device 42 and one-dimensional reproducing devices 70a to 70d in order to adjust the size of output images in one-dimensional reproducing device 70a to 70d.

In one-dimensional reproducing devices 70a to 70d, there were 200 patterns reproducing every 150 μs which corresponded to components of each row comprising two-dimensional picture images which picked up a three-dimensional object from different angle directions. The galvano mirror used as picture image deflection device 42 was modulated through a sawtooth signal voltage having frequency of 30 Hz and an amplitude of 0 to 10 V, and reflective positions of the galvano mirror were determined in accordance with the amplitude of the signal voltage within this periodic time. Therefore, 200 patterns which were displayed from one-dimensional reproducing devices 70a to 70d sequentially at a predetermined time interval within 1/30 second were deflected in the horizontal direction through vibrations of the galvano mirror and were output as two-dimensional picture images having a resolving power of 200×200. When an observer 44 watched these output images, perceived images were natural and stereoscopic, and there was no flickering. Furthermore, a range in which observer 44 can perceive the stereoscopic vision was found to be 10 cm to 2 m in the rear from the front central position of picture image deflection device 42 in the lengthwise direction, and ±50 cm at the maximum in a position of 2 m depth in the horizontal direction. Within this range, sides of the stereoscopic object could be observed by changing the observation position to right and left. In this way, natural three-dimensional picture images expanding spatially in depth were observed.

Experiment 8

A three-dimensional picture image display apparatus shown in FIG. 9 was produced experimentally.

Figure 18:
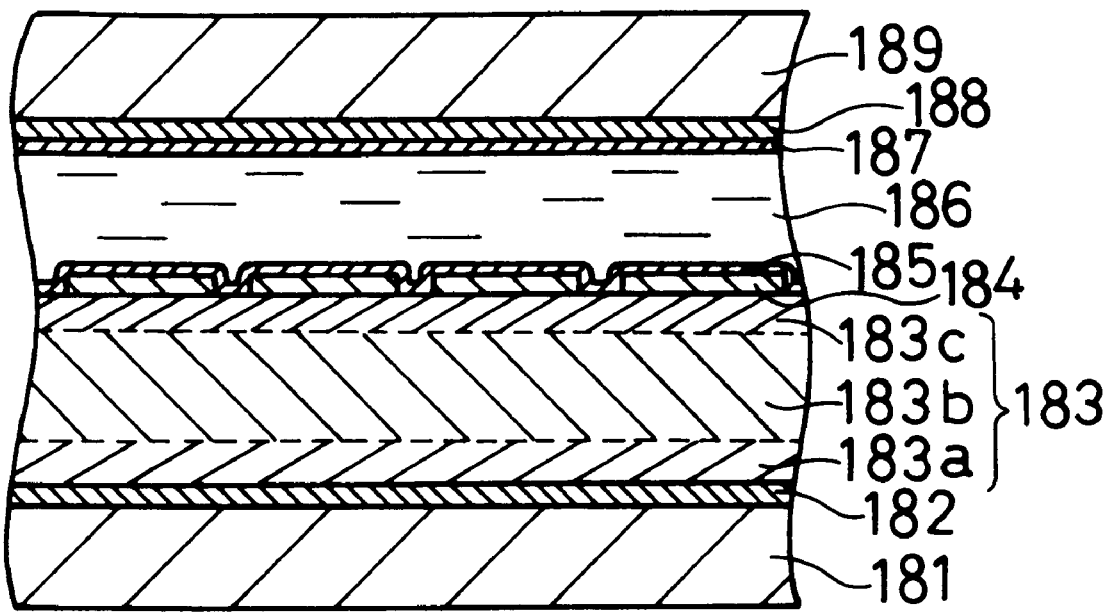
FIG. 18 is a sectional view showing a configuration of a spatial light modulator used in an embodiment of a three-dimensional picture image display apparatus of this invention.
Figure 19C:
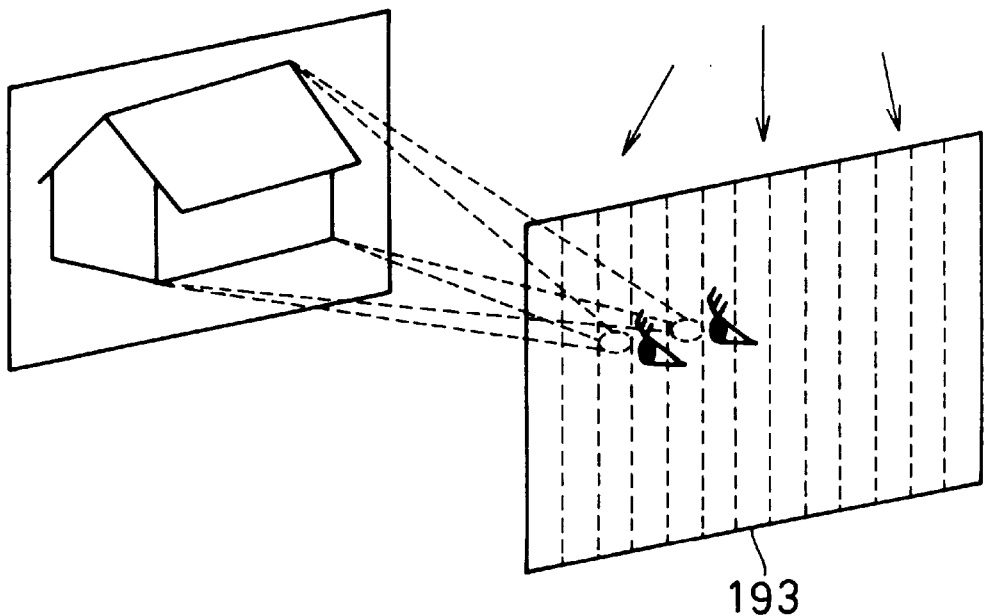
Figure 19D:
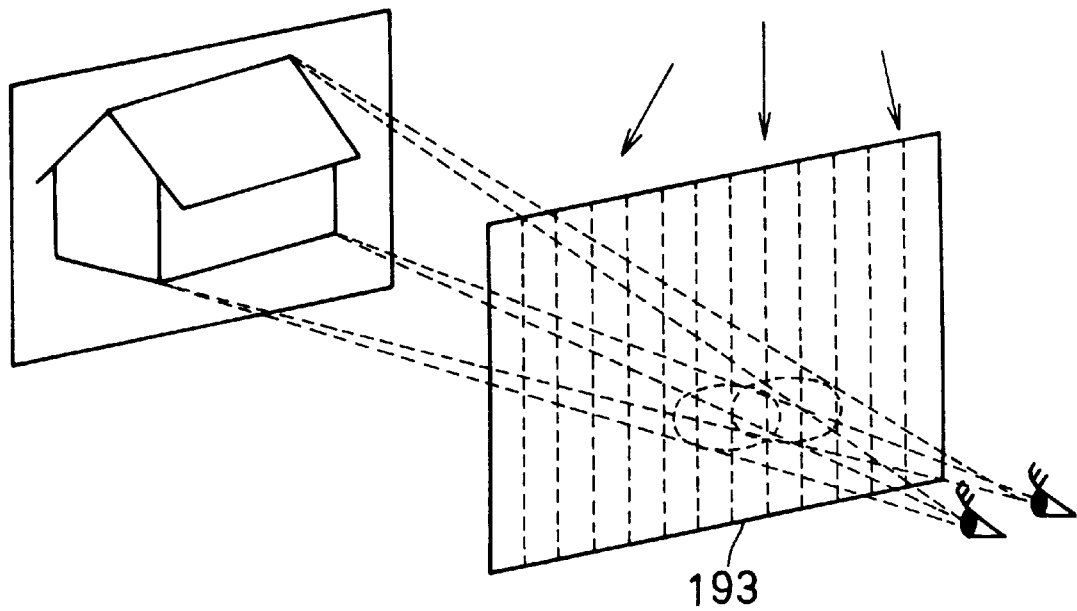

First, an example of a spatial light modulator 64 related to this invention is shown in FIG. 18. This element is comprised of a transparent substrate 181 (e.g., glass) displosed thereon with a transparent electrode 182 (e.g., ITO, ZnO, SnO$_2$), a photoconductive layer 183 (or a light-intercepting layer) having rectification, a metal reflective film 183c separated in microform (e.g., metals such as Al, Ti, Cr, Ag, and two or more kinds of metals in lamination) thereon, and an orientation film 185 (e.g., a high molecular thin film such as polyimide) for orientating the liquid crystal. Then, another substrate 189 is (e.g., glass) formed with a transparent substrate 188 (e.g., ITO, ZnO, SnO$_2$) applied thereon with an orientation film 187 (e.g., a high molecular thin film such as polyimide). At last, these two substrates were applied to each other with a certain space inbetween where a ferroelectric liquid crystal 183 was injected.

Examples of material used for photoconductive layer 183 are compound semiconductors such as CdS, CdTe, CdSe, ZnS, ZnSe, GaAs, GaN, GaP, GaAlAs, InP; amolphous semiconductors such as Se, SeTe, AsSe; polycrystalline or amolphous semiconductors such as Si, Ge, Si$_{1-x}$C$_x$, Si$_{1-x}$Ge$_x$, Ge$_{1-x}$C$_x$ (0<x<1); or (1) phthalocyanine pigment (abbreviated as Pc), for example, ametals such as Pc, XPc (e.g., X=Cu, Ni, Co, TiO, Mg, Si(OH)$_2$), AlClPcCl, TiOClPcCl, ClPcCl, InClPcCl, InClPc, InBrPcBr; (2) azo-type coloring matters such as monoazo color, diazo color; (3) penylen type pigment such as penylen acid anhydride, penylen acid imide; (4) indigoid dye; (5) quinacridone pigment; (6) polycyclic quinone class such as anthraquinone class, pyrene quinone; (7) cyanin dye; (8) xanthene dye; (9) charge-transfer complex such as PVK/TNF; (10) eutectic complex formed of pyrylium salt dye and polycarbonate resin; and (11) organic semiconductors such as azulenium salt compound. Furthermore, when amolphous Si, Ge, Si$_{1-x}$C$_x$, Si$_{1-x}$Ge$_x$, Ge$_{1-x}$C$_x$ (hereinafter abbreviated as a-Si, a-Ge, a-Si$_{1-x}$C$_x$, a-Si$_{1-x}$Ge$_x$, a-Ge$_{1-x}$C$_x$) are used for photoconductive layer 183, hydrogen or halogen element may be included, and oxygen or nitrogen may be included to reduce dielectric constant and to enhance resistivity. In order to control the resistivity, p-type impurities such as B, Al, and G elements or n-type impurities such as P, As, and Sb elements may be added here. In this way, amolphous materials with impurities added can be laminated to form junctions of p/n, p/i, i/n, and p/i/n, and the dielectric constant and background resistance or an operating voltage polarity may be controlled by forming a depletion layer within photoconductive layer 183. Not only these amolphous materials, but also two or more kinds of the above-noted materials may be used in lamination for forming a hetero-junction and for forming a depletion layer within photoconductive layer 183. A preferred thickness of photoconductive layer 183 is from 0.1 to 10 μm.

In addition, it is preferable that light-intercepting sensitivity of photoconductive layer 183 is enhanced by generating photoelectric current with quantum efficiency of more than 1 through formation of, for example, a photodiode structure of p/i/n in which i-layer is formed into a superlattice by laminating two or more materials mentioned above alternately.

A manufacturing method of this element will be explained in a concrete example. First, an ITO thin film as a transparent electrode 182 was deposited by an evaporation method on top of a glass substrate 181 (40 mm×40 mm×0.3 mm). A thickness of the ITO film was 1000 angstrom. Next, as photoconductive layer 183, pin-structured amolphous silicone (a-Si:H) was deposited by a plasmatic CVD method. At this time, thicknesses of p-layer 183a, i-layer 183b, and n-layer 183c were determined to be 100 nm (1000 angstrom), 1450 nm, and 450 nm which added up to 2 μm. Impurities B (boron) were added to p-layer 183a in an amount of 400 ppm, and P (phosphorus) was added to n-layer 183c in an amount of 40 ppm. Nothing was added to I-layer 183b. Then, metal reflective film 184 was manufactured by forming Cr allover through a vacuum evaporation method and then by dividing it in microform with use of photolithography. Here, metal reflective film 184 had a size of 20 μm×20 μm, and a width between picture images was 5 μm. Furthermore, a number of picture element was determined as 106 (1000×1000). Polyamic acid was applied from above by a spin coat method and was formed into polyimide orientation film 185 through thermosetting. Thickness of the polyimide film was determined as 10 nm. An orientation process was conducted by rubbing a surface of orientation film 187 in one direction with a nylon cloth. In the same manner, the other substrate 189 (glass) was disposed thereon with ITO transparent electrode 188, and polyimide orientation film 187 was formed for the orientation process. Next, beads having a diameter of 1 μm were distributed on top of this substrate 189 which was then applied to the other substrate 181, thereby forming a gap of 1 μm between the both substrates. At last, this gap was filled by injecting ferroelectric liquid crystal 186, and a heat treatment was conducted. Spatial light modulator 64 was completed in this method.

Next, picture image deflection device 42 was configured as in FIG. 6 in which an ultrasonic medium 112 was manufactured by using a dense flint glass in the range of 50 μm to 200 μm to form a size of 30 inches. Furthermore, $LiNbO_3$ was used for a transducer 111 and fused quartz as an ultrasonic absorber 113.

Picture image deflection device 42 consisting of AO devices was impressed with a sawtooth ultrasonic signal of from 0 to 20 V with two frequencies determined as 50 MHz and 100 MHz. In the both frequencies, an inversion of an amplitude of the sawtooth signal voltage was used for deflecting in four directions corresponding to the directions when the picture images were picked up as shown in FIG. 4.

As a result, a maximum deflection angle in the horizontal direction was from −40 degrees to +40 degrees, and a stereoscopic vision was possible at a distance of 30 cm to 4 m from the front central position of picture image deflection device 42 in the lengthwise direction and ±1 m at the maximum in a position of 4 m depth in the horizontal direction.

In addition, since three-dimensional picture images having a wide angle of visibility with its 30 inch large screen were reproduced, a spatial screen effect worked preferably in which a picture frame on the displayed face was scarcely noticed, and thus, a large and impactful stereoscopic image could be perceived.

Experiment 9

In the three-dimensional display apparatus manufactured in Experiment 8, picture image deflection device 42 used here was configured as in FIG. 12(*a*). A manufacturing method of picture image deflection device 42 will be explained in a concrete example. ITO as transparent electrodes 122 to 124 were formed on a glass substrate with an opposite angle of 10 inches by a evaporation method. This glass substrate and a spacer with a thickness of 10 μm to 100 μm were used to manufacture prismatic cells 121 to 125.

Although it is not indicated in FIG. 12(*a*), there had been the same orientation process conducted on the surface of transparent electrodes 122 to 124 by a polyimide film as in the manufacturing process of the spatial light modulator.

An orientation method was selected to be a homogeneous orientation in which orientation directions of transparent electrodes 122 and 124 become parallel to each other. This was for the purpose of adjustment in such a manner that when a signal voltage was impressed to a nematic liquid crystal which was used as an example of liquid crystal being filled into prismatic cells 121 and 125, input picture images should not be modulated in the intensity through the impressed voltage, but instead, only an optical path of the input picture images should be changed.

As for the impressed signal voltage, a signal wave form of chopping wave as shown in FIG. 12(*b*) was used with an amplitude of 5 V and a frequency of 8 Hz, where a wave form 1 and a wave form 2 were formed such that one phase was shifted 180 degrees from the other phase.

As a picture image reproducing device 66, CRT with an opposite angle of 6 inches was used. In this CRT 66, picture images of a three-dimensional object 161 picked up from four directions by four CCD cameras 163*a* to 163*d* of FIG. 16(*a*) were once memorized in a flame memory, and then, these images were reproduced every 16 ms at a predetermined time interval and were readout into the photoconductive layer of spatial light modulator 64.

After readout light from a light source 61 was converged by a condenser lens 62, this light was input in the liquid crystal side of spatial light modulator 64, and then, a reflected light therefrom was reflected by a beam splitter 63, and the picture images were projected by a projection lens 67 on picture image deflection device 42. A diffusion-transmission screen 43 formed by applying a polyethylene sheet on a plastic board with an opposite angle of 12 inches was used in close contact with picture image deflection device 42.

By using the same doll as a three-dimensional object as in Experiment 2, the three-dimensional picture image display apparatus manufactured here was operated experimentally. When attained picture images were observed, the same natural stereoscopic image as in Experiment was observed in the bright picture images.

Experiment 10

In the three-dimensional display apparatus manufactured in Experiment 8, picture image deflection device 42 was configured as in FIG. 13. A manufacturing method of the picture image deflection device shown in FIG. 13 will be explained in a concrete example.

Transparent electrodes of ITO were formed on a glass substrate with an opposite angle of 10 inches in full solid by an evaporation method. From the right hand side, strip grooves with a width of 10 μm to 100 μm were formed by etching ITO at a position of 2.5 inches, thereby separating ITO into two parts. Two pieces of this glass substrate were combined to construct a panel with a thickness of 10 μm to 100 μm, which were functioned in the same manner as a combination of rectangular cells 131 and 132 shown in FIG. 13. Next, ITO was etched at a position of 5 inches from the right side, and a central panel in FIG. 13 was manufactured. In the same way, another panel was manufactured by etching ITO at a position of 7.5 inches from the right side, and these three pieces of panels were combined to configure the picture image deflection device shown in FIG. 13.

An orientation process was selected to be a homogeneous orientation as in Experiment 9 with use of a nematic liquid crystal. Transparent eletrodes 137*g* to 137*l* served as common electrodes, while transparent electrodes 137*a*, 137*c* and 137*e* were impressed with a signal voltage shown in FIG. 12(*b*). Then, transparent electrodes 137*b*, 137*d*, and 137*f* were impressed with a signal voltage shown in FIG. 12(*c*). A wave form of the signal voltage was the same as in Experiment 9.

When the three-dimensional picture image display apparatus was operated as in Experiment 9, a bright stereoscopic image could be observed. In addition, the picture images were clear also in a contour part since picture image deflection device 42 was constructed with plane panels.

Experiment 11

A three-dimensional display apparatus was manufactured by configuring picture image deflection device 42 as in FIG. 14. A manufacturing method of the picture image deflection device shown in FIG. 14(*a*) will be explained in a concrete example.

First, ITO was formed on a glass substrate with an opposite angle of 10 inches in full solid by an evaporation method. In the same way, one more sheet of glass substrate with ITO formed allover was manufactured. Transparent picture element electrodes 143a to 143l were formed by etching strip grooves with a width of 5 μm to 50 μm. Two sheets of these glass substrates were combined to form liquid crystal cell 141 with a cell thickness of 10 μm to 100 μm. In addition, an orientation process was selected to be a homogeneous orientation as in Experiment 9 with use of a nematic liquid crystal.

As for impressed voltage, a sawtooth signal wave form shown in FIG. 14(b) or an inversed signal thereof was provided in an amplitude range of 0 to 10 V by using four pieces of transparent picture element electrodes for one wave form. Thus, a refractive index distribution of liquid crystal occured within liquid crystal cell 141, and through the function of phase diffraction grating, the picture images were deflected in any optional direction of right and left.

When the three-dimensional picture image display apparatus was operated as in Experiment 9 with use of picture image deflection device 42 manufactured above, a bright stereoscopic image could be observed. In addition, a continuity of the picture images perceived during a change in the observation position was more smooth than in Experiments 9 or 10.

The invention may be embodied in other specific forms without departing from the spirit and scope thereof. The embodiments are to be considered in all respects as illustrative and not restrictive. The scope of the invention is indicated by the appended claims rather than by the foregoing description, and all changes which come within the meaning and range of equivalency of the claims are intended to be embraced therein.

What is claimed is:

1. A three-dimensional picture image display apparatus comprising:

picture image pickup means for picking up one-dimensional or two-dimensional picture images of an object;

single picture image reproducing means;

single picture image deflection means for deflecting each of the picture images reproduced by the picture image reproducing means in a predetermined deflection direction corresponding to a direction in which the picture image is picked up by the picture image pickup means, and a diffusion-transmission screen for displaying the deflected picture images having a transmission characteristic which is larger than a diffusion characteristic, wherein the picture image pickup means is (i) a picture image pickup means comprising a plurality of picture image pickup devices which are horizontally and/or vertically arranged, or (ii) a picture image pickup means comprising a plurality of mirrors and a picture image pickup device, the mirrors being horizontally and/or vertically arranged so that light beams from the object are respectively reflected in different directions by the mirrors to reach the picture image pickup device, said picture image pickup means (i) or (ii) picking up the one-dimensional or two-dimensional picture images of the object sequentially one by one from different directions of the plurality of picture image pickup devices or the plurality of mirrors and picture image pickup device at a predetermined time interval, said picture image reproducing means reproducing and displaying the one-dimensional or two-dimensional picture images, which are picked up sequentially one by one by the picture image pickup means at the predetermined time interval, sequentially one by one for less than 1/30 second in synchronism with the predetermined time interval, said picture image deflection means deflecting each of the displayed picture images in a predetermined deflection direction corresponding to the direction, in which the picture image is picked up, and wherein the deflected picture images are passed through the diffusion-transmission screen for display.

2. The three-dimensional picture image display apparatus in accordance with claim 1, wherein the picture image pickup device is a video camera.

3. The three-dimensional picture image display apparatus in accordance with claim 1, wherein the predetermined deflection direction of the picture image deflection means is in a direction of the mirror facing the object.

4. The three-dimensional picture image display apparatus in accordance with claim 1, wherein a shutter is disposed in front of each of the mirrors and the shutter is driven for opening and closing the surface of the mirror at the predetermined time interval.

5. The three-dimensional picture image display apparatus in accordance with claim 4, wherein the shutter is a mechanical shutter or a transmittance changeable shutter.

6. The three-dimensional picture image display apparatus in accordance with claim 5, wherein the transmittance changeable shutter is a liquid crystal shutter using twist nematic liquid crystal, a ferroelectric liquid crystal shutter, an antiferroelectric liquid crystal shutter, or a dynamic scattering mode liquid crystal shutter.

7. The apparatus in accordance with any one of claims 1–6, wherein the picture image reproducing means is selected from the group consisting of a cathode ray tube display device; a plasma display device; an electroluminescence display device; a liquid crystal display device using a twist nematic liquid crystal, a ferroelectric liquid crystal, an antiferroelectric liquid crystal, or a dynamic scattering mode liquid crystal; and a one-dimensional picture image reproducing device comprising a plurality of light emitting diodes in a combined form, a cathode ray tube, an electroluminescent element, and a liquid crystal reproducing element selected from the group consisting of a twist nematic liquid crystal, a ferroelectric liquid crystal, an antiferroelectric liquid crystal, and a dynamic scattering mode liquid crystal.

8. The apparatus in accordance with any one of claims 1–6, wherein the picture image deflection means is a movable mirror.

9. The apparatus in accordance with any one of claims 1–6, wherein the picture image deflection means is a movable mirror array.

10. The three-dimensional picture image display apparatus in accordance with claim 1, wherein the picture image deflection means is a device which deflects picture images in a plurality of directions by changing a refractive index of a light transparent medium.

11. The three-dimensional picture image display apparatus in accordance with claim 10, wherein the device is an acoustic optical element or a liquid crystal optical element.

12. The apparatus in accordance with any one of claims 1–6, 10 or 11, wherein the deflection angles of N output images are selected so that the region visible from behind the diffusion-transmission screen are divided into (2N−1) regions responding to the multiplicity of overlaps of the N visible regions, where N is an integer greater than 1.

13. The three-dimensional picture image display apparatus in accordance with claim 12, wherein the region where the N visible regions overlap is contained in the divided regions.

14. The apparatus in accordance with any one of claims 1–6, 10 or 11, wherein intensity modulation means for modulating the intensity of the picture image reproduced by the picture image reproducing means is provided between the picture image reproducing means and the picture image deflection means.

15. The three-dimensional picture image display apparatus in accordance with claim 14, wherein the intensity modulation means is a spatial light modulator having a light information writing side and a light information readout side in a separate form, and the spatial light modulator modulates the intensity of the written picture image and transfers to the light information readout side.

* * * * *